(12) United States Patent
Smith

(10) Patent No.: US 10,467,585 B2
(45) Date of Patent: Nov. 5, 2019

(54) BEVERAGE PRODUCT ACQUISITION AND INVENTORY MANAGEMENT SYSTEM

(71) Applicant: Jason K. Smith, Breckenridge, CO (US)

(72) Inventor: Jason K. Smith, Breckenridge, CO (US)

(73) Assignee: Jason K. Smith, Breckenridge, CO (US)

( * ) Notice: Subject to any disclaimer, the term of this patent is extended or adjusted under 35 U.S.C. 154(b) by 612 days.

(21) Appl. No.: 15/061,026

(22) Filed: Mar. 4, 2016

(65) Prior Publication Data

US 2016/0267430 A1    Sep. 15, 2016

Related U.S. Application Data

(60) Provisional application No. 62/132,623, filed on Mar. 13, 2015.

(51) Int. Cl.
*G06Q 10/08* (2012.01)
*G06Q 30/02* (2012.01)
*G06Q 30/06* (2012.01)

(52) U.S. Cl.
CPC ....... *G06Q 10/087* (2013.01); *G06Q 30/0222* (2013.01); *G06Q 30/0635* (2013.01)

(58) Field of Classification Search
CPC .................................................. G06Q 30/02
See application file for complete search history.

(56) References Cited

U.S. PATENT DOCUMENTS

| 7,124,107 B1* | 10/2006 | Pishevar ............... G06Q 30/06 705/37 |
| 2002/0002501 A1* | 1/2002 | Reyda ..................... E21B 43/24 705/26.8 |
| 2002/0099631 A1* | 7/2002 | Vanker ................. G06Q 10/087 705/28 |

(Continued)

FOREIGN PATENT DOCUMENTS

WO    2007011486 A2    1/2007

OTHER PUBLICATIONS

Appsuite, "Revolutionizing Restaurant Customer Loyalty & Reward Programs," Sep. 16, 2014, 5 pages.

(Continued)

*Primary Examiner* — Vincent M Cao
(74) *Attorney, Agent, or Firm* — Dorsey & Whitney LLP

(57) ABSTRACT

A method of optimizing computerized inventory orders over a distributed network is disclosed. The method includes receiving, from a first user device connected to the distributed network, a list of products, the list including a par value and an inventory value associated with each of the products, determining, an inventory order based, on the associated par value and the associated inventory value of each of the products, receiving, from a second user device connected to the distributed network, a set of available promotions, transmitting, the set of available promotions associated with at least one of the products to the first user device, receiving, from the first user device, a selection of at least one promotion of the set of available promotions, and automatically adjusting, a price of at least one of the products associated with the at least one promotion to the inventory order.

19 Claims, 56 Drawing Sheets

(56) References Cited

U.S. PATENT DOCUMENTS

| | | | |
|---|---|---|---|
| 2002/0143434 A1* | 10/2002 | Greeven | G06F 19/3418 700/236 |
| 2005/0222910 A1 | 10/2005 | Wills | |
| 2007/0050229 A1* | 3/2007 | Tatro | G06Q 10/087 705/15 |
| 2009/0055264 A1* | 2/2009 | Wolfson | G06Q 30/02 705/14.34 |
| 2011/0213729 A1* | 9/2011 | Pechanec | G06Q 10/00 705/348 |
| 2011/0320246 A1* | 12/2011 | Tietzen | G06Q 30/02 705/14.4 |
| 2012/0150674 A1* | 6/2012 | Musa | G06Q 10/087 705/22 |
| 2012/0203611 A1* | 8/2012 | Mesaros | G06Q 10/08 705/14.23 |
| 2013/0268359 A1 | 10/2013 | Young | |
| 2014/0156399 A1 | 6/2014 | Jones et al. | |
| 2014/0164046 A1 | 6/2014 | Haralambos et al. | |

OTHER PUBLICATIONS

Syrus Restaurant Information Services, "Powerful Restaurant Inventory Software," Jul. 5, 2014, 7 pages.

Data Central, "Inventory Control," Restaurant Magic Software, Jun. 17, 2013, 2 pages.

* cited by examiner

| | |
|---|---|
| Back  Distributor Breakdown | |
| Order Subtotal: | (18 items) $2,471.35 |
| Order Savings: | (3 promotions) $148.39 |
| MNTB | $177.90 |
| NAT | $692.99 |
| RUTK | $322.25 |
| STAN | $245.00 |
| SUMM | $252.96 |
| SWS | $477.38 |

BEVERAGE PRODUCT ACQUISITION AND INVENTORY MANAGEMENT SYSTEM

CROSS REFERENCE TO RELATED APPLICATIONS

This application claims priority to U.S. Provisional Patent Application No. 62/132,623 entitled "BEVERAGE PRODUCT ACQUISITION AND INVENTORY MANAGEMENT SYSTEM" filed Mar. 13, 2015, which is incorporated herein by reference for all purposes.

TECHNICAL FIELD

The present disclosure relates generally to inventory acquisition and management, and specifically to an integrated computer system for acquiring and managing beverage inventories.

BACKGROUND

Traditional systems for managing beverage inventories are largely fragmented with each party to the system maintaining its own distinct interfaces, capabilities, and limitations. For example, a restaurant or bar owner (hereinafter the "merchant") may have one inventory system, while a sales representative for a distributor may have another system. These systems may or may not be integrated with the distributor's system. Further, the supplier may also have a unique system that differs in form and function from the supplier, sales representative, and merchant systems. Merchants also typically maintain relationships with multiple distributors for various different products. Therefore, from the merchant perspective, the potential problems may be multiplied based on the number of distributors with which the merchant works.

SUMMARY

In one embodiment, the present disclosure relates to a method for beverage product acquisition and inventory management. The method includes receiving, from a first user device, a list of one or more products, the list including a par value and an inventory value for each of the one or more products, determining, by one or more processors, an inventory order based, at least in part, on the associated par value and the associated inventory value, receiving, from a second user device, a set of available promotions, transmitting by one or more processors, the set of available promotions to the first user device, receiving, from the first user device, a selection of at least one promotion of the set of available promotions, and applying, by the one or more processors, the at least one promotion to the inventory order.

In another embodiment, the present disclosure relates to a system for integrating a beverage distribution chain. The system includes a server computer having a content management system stored thereon for maintaining beverage product information, a merchant device connected to the server computer via a network, and having stored thereon a computer application for accessing the content management system via the network and submitting orders of beverage products, a sales representative device, connected to the server computer via the network, and having stored thereon a computer application for accessing the content management system and receiving orders of beverage products, a distributor device, connected to the server computer via the network, and having stored thereon a computer application for accessing the content management system, creating and sharing advertisements, and/or receiving orders of beverage products, and a supplier device, connected to the server computer via the network, and having stored thereon a computer application for accessing the content management system, creating and sharing advertisements, and/or receiving orders of beverage products.

In yet another embodiment, the present disclosure relates to a computer program product. The computer program product includes a computer readable storage device having stored thereon program instructions for ordering beverage products, the program instructions comprising: program instructions to receive from a merchant device a beverage product order comprising a plurality of beverage products, program instructions to identify a distributor for each of the beverage products in the plurality of beverage products, program instructions to generate one or more sub-orders, wherein each sub-order corresponds to one identified distributor, and program instructions to transmit each sub-order to the corresponding identified distributor.

BRIEF DESCRIPTION OF THE DRAWINGS

FIGS. 9-56 are example screenshots depicting an exemplary embodiment of the networked beverage inventory management and acquisition system of FIG. 1.

DETAILED DESCRIPTION

Embodiments disclosed herein recognize that interoperability and streamlining of business enterprise computer systems improves the operation of businesses and avoids problems of loss and miscommunication. Further, embodiments recognize that current beverage inventory systems are largely fragmented with each level of the product supply chain maintaining its own unique system, which is largely incompatible with systems used at other stages of the supply chain. Disclosed herein are various systems and methods for using a centralized content management system ("CMS") to provide a streamlined and robust system of managing beverage product inventory and ordering. Among other applications, embodiments disclosed herein are particularly useful in improving existing networked inventory management systems and integrating previously incompatible systems into a single, unified inventory management and beverage product acquisition system. Additionally, embodiments described herein provide a central hub for both large, integrated suppliers and distributors as well as small, independent suppliers and distributors.

Figure 1:
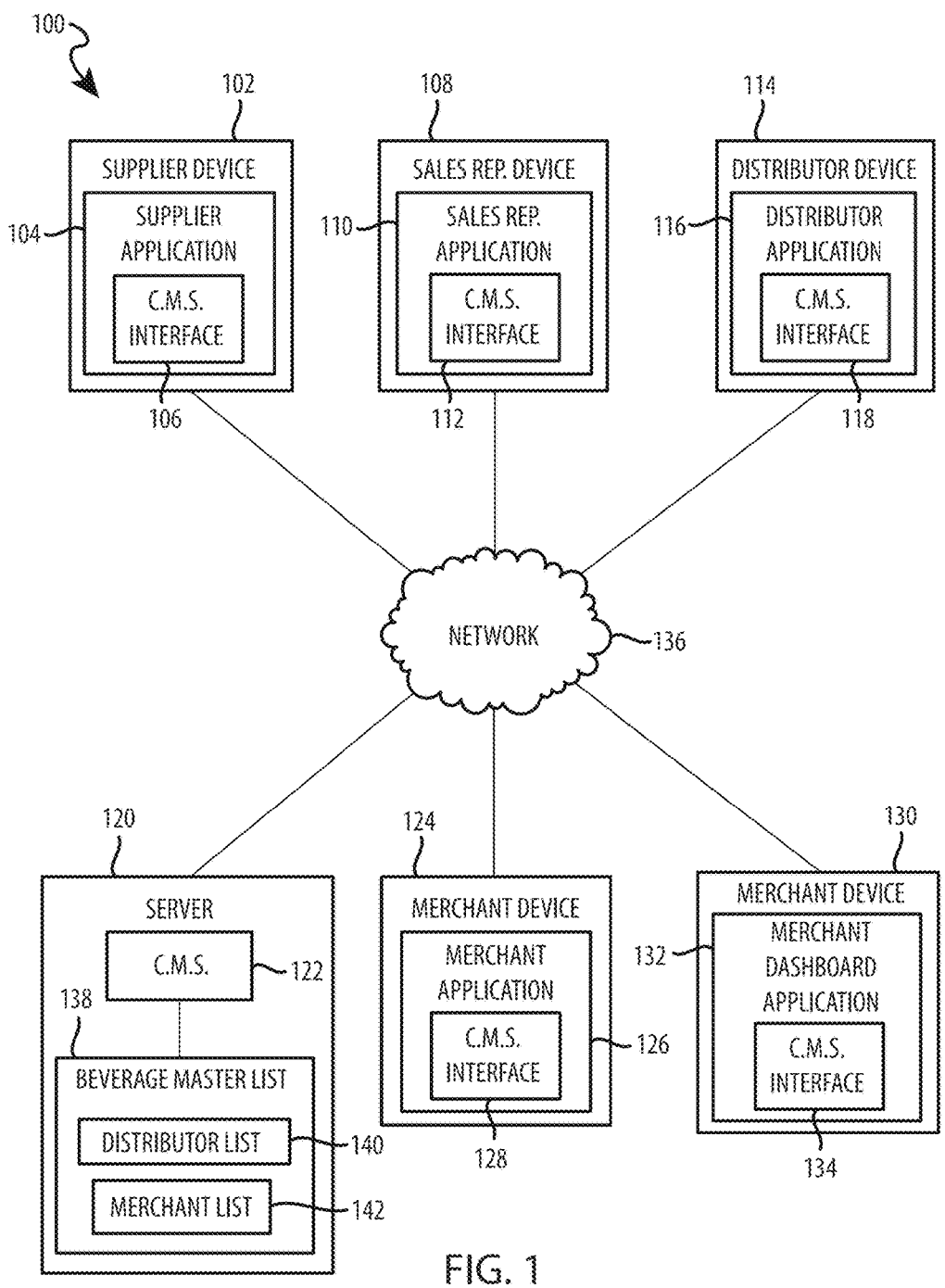
FIG. 1 is a functional block diagram depicting a networked beverage inventory management and acquisition system.

FIG. 1 is a functional block diagram depicting a networked beverage inventory management system, generally designated 100, in accordance with an exemplary embodiment.

Inventory management and acquisition system 100 generally includes supplier device 102, sales representative device 108, distributor device 114, server 120, merchant device 124, and merchant device 130, all interconnected over network 136. Network 136 may include connections such as wiring, wireless communication links, fiber optic cables, and any other communication medium. Network 136 may be a wide area network (WAN), such as the Internet, a local area network (LAN), or any other suitable network. In general, network 136 can be any combination of connections and protocols that will support communications between various other devices and computing systems included in inventory management and acquisition system 100.

In various embodiments, supplier device 102, sales representative device 108, distributor device 114, server 120, and merchant devices 124 and 130 may be desktop computers, laptop computers, tablet computers, smartphones, personal digital assistants, or any other programmable electronic device capable of communicating with the other devices in inventory management and acquisition system 100 via network 136. In certain embodiments, server 120 may be a computing system utilizing clustered computers and components to act as a single pool of seamless resources when accessed through network 136, as is common in data centers and cloud computing.

In the embodiment of FIG. 1, server 120 is a computing system for maintaining CMS 122. Maintenance of CMS 122 includes periodically receiving and updating information stored in CMS 122. In various embodiments, CMS 122 may be a system for maintaining current and past beverage product orders, as well as storing and updating inventory and par value information for various entities in the beverage product supply chain (e.g., merchants, distributors, and suppliers). In various embodiments, CMS 122 maintains records that are accessible through CMS interfaces stored on user devices (e.g., merchant device 124, distributor device 114, etc.). CMS system 122 may maintain a plurality of accounts for different users accessing CMS 122. The type of account may define how a user may interact, access, and modify the contents of CMS 122. For example, a merchant may be able to access a list of distributors in the merchant's geographic area. Likewise, a distributor account may enable a user to create and disseminate various promotional offers to other users.

Server 120 may also include master beverage list 138. In various embodiments, master beverage list 138 is a database containing product information for a plurality of beverage products. Master beverage list 138 may include information, such as the universal product code, quick response code, or other identifier, about all beverage products available for inventory or acquisition through inventory management and acquisition system 100 (e.g., all of the products available through one or more distributors). Master beverage list 138 may further include one or more sub lists, such as distributor list 140 and merchant list 142. In certain embodiments, distributor list 140 and merchant list 142 include information on specific beverage products offered by distributors or merchants, respectively. For example, Distributor list may include a plurality of distributors and a list of beverage products included in beverage master list 138 that each distributor offers. The specific beverage products may be indexed to the distributors, for example, based on location, or any other appropriate information. In one embodiment, beverage master list 138 includes a database for each of the plurality of distributors. Similarly, merchant list 142 may include a plurality of merchants and be associated with or indexed to each of the beverage products in beverage master list that the merchant offers for sale.

In the embodiment of FIG. 1, supplier device 102 includes supplier application 104. Supplier application 104 is a computer executable application capable of sending and receiving beverage ordering information via network 136. Supplier application 104 may further include CMS interface 106. As discussed in further detail below, CMS interface 106 may be a computer readable application capable of accessing and/or modifying information included in CMS 122 via network 136. In various embodiments, CMS interface 106 includes one or more specialized functions specific to supplier application 104. For example, in one embodiment, CMS interface 106 allows a user of supplier device 102 to view and access one or more credit applications of various merchants and/or distributors, view and contact all approved distributors, set and modify various pricing information for beverage products, and/or set and modify various promotional offers. In one example, the merchant may complete a single credit application that may be used to supply credit information to multiple suppliers or distributors.

CMS interface 106 can update information stored in CMS 122 to be viewable from other devices within inventory management and acquisition system 100, such as distributor device 114, sales representative device 108, etc. Supplier application 104 may further include a design application for generating promotional offers and advertisements, which may be transmitted via network 136 to merchant devices 124 and 130. Supplier application 104 may include data mining capabilities, which allow a user of supplier device 102 to select specific product and sales information based on a plurality of factors, such as location of sales, amount of sales, etc.

In the embodiment of FIG. 1, sales representative device 108 includes sales representative application 110. Sales representative application 110 is a computer executable application capable of sending and receiving beverage ordering information via network 136. In various embodiments, sales representative application 110 may include computer executable instructions for simultaneously managing various beverage inventory orders and promotional offers. Additionally, sales representative application 110 may include instructions for communicating order confirmations with one or more devices within inventory management and acquisition system 100. Sales representative application 112 may further include CMS interface 112 for accessing and modifying information in CMS 122 via network 136. In various embodiments, sales representative application 110 and CMS interface 112 may provide specific functionality to a user of sales representative device 108, such as the ability to add promotional offers to pending orders, the ability to confirm receipt of a beverage product order, the ability to forward received orders to distributor device 114 and/or supplier device 102 via network 136.

In the embodiment of FIG. 1, distributor device 114 includes distributor application 116. Distributor application 114 is a computer executable application capable of sending and receiving beverage ordering information via network 136. In various embodiments, distributor application 116 may include CMS interface 118 for accessing and modifying information stored in CMS 122 via network 136. Distributor application 116 may further include computer executable program instructions for providing various functionality to a user of distributor device 114, such as setting and sending product price information to other computing devices, transmitting and receiving communications with sales representative device 108, accessing and modifying a distributor inventory of available beverage products, analyzing orders received from merchant devices to determine whether the orders include all relevant promotional offers, receiving and verifying credit applications from various merchants, and confirming received orders from various merchant devices. When verifying credit applications, a merchant may fill out a single credit application which may then be transmitted to one or more distributor device 114 for approval. In certain embodiments, a merchant may only view pricing information for those distributors that have approved the merchant's credit application.

Distributor application 116 may further include a tiered pricing option which allows a user of distributor device 114 to set different prices for different merchants. Accordingly, when various users of merchant devices 124 and 130 access a product associated with distributor device 114, different price points may be used. Price levels may also be product specific, such that a merchant may see a price for one product that is at a first price tier and a price of a second product that is at a second price tier. In yet other embodiments, distributor application 116 may include a downhill message service which allows distributor device 114 to transmit messages to sales representatives and/or merchants. The message service may be one-sided, such as a publisher-subscriber system to allow for transmission of messages in one direction, but not in the other. Distributor application 116 may further include data mining capabilities as discussed above with respect to supplier application 104

In the embodiment of FIG. 1, merchant device 124 includes merchant application 126. Merchant application 126 is a computer executable application capable of sending and receiving beverage ordering information via network 136. For example, merchant application 126 may include an order module for building a beverage product order. In certain embodiments, merchant application 126 further includes an inventory module for tracking a user's beverage product inventory. For example, merchant application 126 may allow a user to build a list of beverage products offered by the merchant. The user may set an inventory, or "on hand" value, for each beverage product indicating the current stock of the product. The user may further input a "par value" for each product by indicating the minimum units of a given product that the merchant wishes to have on hand. The par value and on hand values may be stored locally on merchant device 124 or remotely, such as within CMS 122 on server 120. Merchant application 126 may further include a distributor module for allowing a user to select one or more distributors with which the merchant routinely works. In certain embodiments, merchant application 126 further includes CMS interface 128 for remotely accessing and modifying information stored in CMS 122. In one embodiment, merchant device 124 is one of a smartphone, a tablet, or another mobile device.

In the embodiment of FIG. 1, Merchant device 130 includes merchant dashboard application 132. Merchant dashboard application 132 may include similar modules and functionality to merchant application 126. Merchant dashboard application 132 may include further features. For example, merchant dashboard application 132 may allow a user to access and view past orders placed to various distributors within inventory management and acquisition system 100. Additionally, merchant dashboard application 132 may enable a user to access multiple accounts from a single system. For example, if a merchant owns multiple establishments, the user may use merchant dashboard application 132 to access all of the relevant establishments and place orders, manage inventory values, etc. Merchant dashboard application 132 may further include CMS interface 134 for accessing and selectively modifying information stored in CMS 122. In some embodiments, other devices within inventory management and acquisition system 100 (e.g., supplier device 102, sales representative device 108, and distributor device 114) may also include dashboard applications similar to merchant dashboard application 132.

The inventory management and acquisition system 100 may be configurable based on the geographic location of the users of the merchant devices 124 and 130. For example, different states or countries may have different applicable laws regarding the purchase and sale of alcoholic beverages. The inventory management and acquisition system 100 may be configurable to operate according to the applicable laws in the states in which the users of the merchant devices 124 and 130 are located. In one example embodiment, a state may not allow sales representatives of suppliers and distributors. In such an embodiment, the inventory management and acquisition system 100 may operate without the sales representative device 108 and provide direct communication between a supplier and a customer.

Additionally, the inventory management and acquisition system 100 may maintain a database of applicable laws and/or rules for each relevant geographical region, which may be updated periodically. The inventory management and acquisition system 100 may be configurable based on manual user input, such as by a user of the merchant device 124 and/or 130. Alternatively, the geographic location may be determined automatically based on, for example, global positioning system data associated with the merchant devices 124 and 130. Once the geographical location of the merchants is determined, the inventory management and acquisition system 100 may automatically reconfigure itself in accordance with the applicable laws of the relevant region to ensure that all parties are in compliance with the applicable laws of the region.

Figure 2:
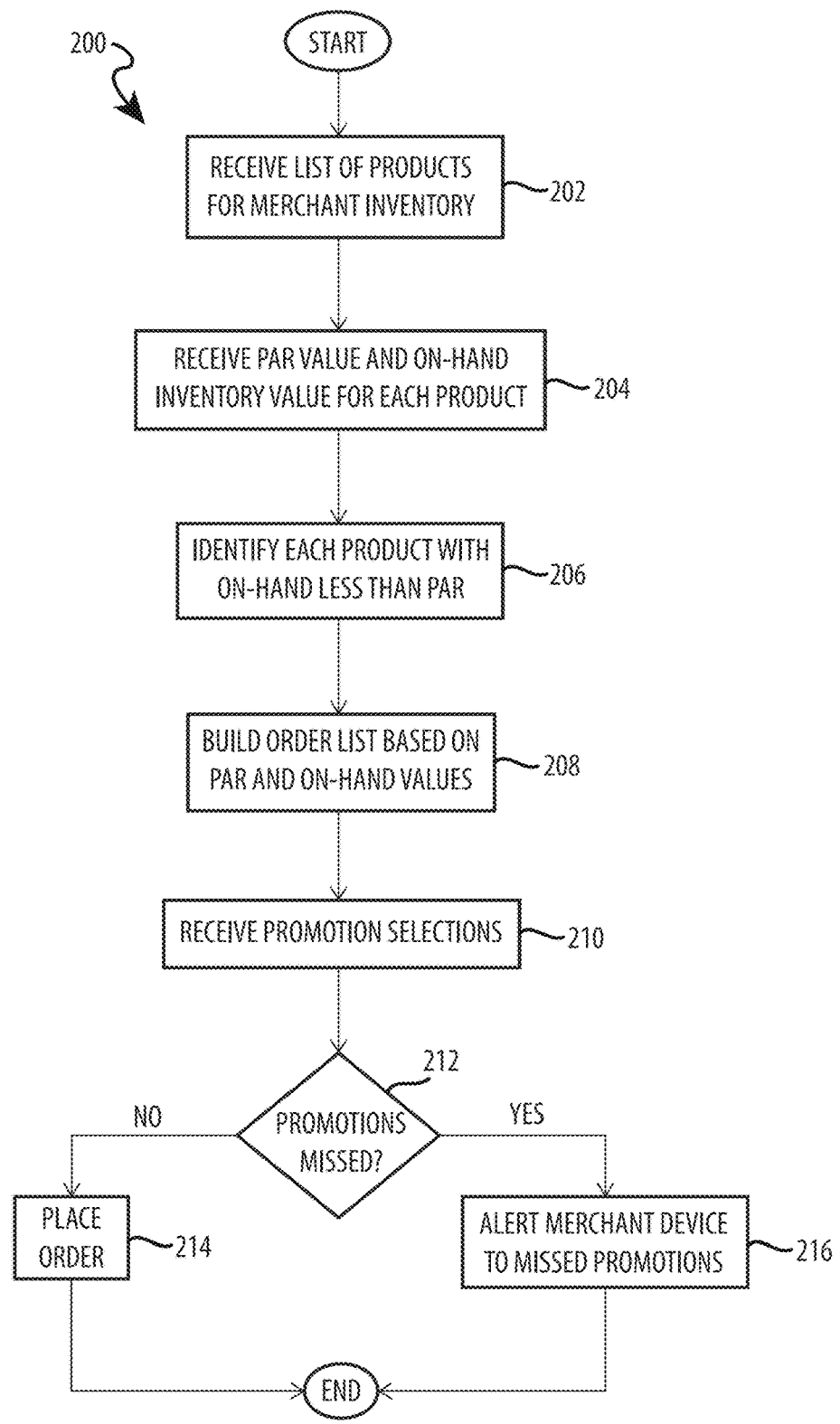
FIG. 2 is a flowchart depicting operations for building and placing an order of beverage products.

FIG. 2 is a flowchart depicting operations, generally designated 200, for building and placing an order of beverage products, in accordance with an embodiment of the present invention. For simplicity, the operations are described as being performed by CMS 122, however, those skilled in the art will appreciate that the described operations may be performed as part of any suitable computer executable application including, but not limited to, supplier application 104, sales representative application 110, distributor application 116, merchant application 126, or merchant dashboard application 132.

In operation 200, CMS 122 receives a list of products for a merchant inventory. In various embodiments, a user of merchant device 124 may select, through CMS interface 128, one or more beverage products offered by one or more of the suppliers/distributors using inventory management and acquisition system 100. For example, a Merchant application 126 may include a drop down menu of the various distributors and suppliers included in inventory management and acquisition system 100 as well as a list of the beverage products offered by them. The user of merchant device 124 may navigate the CMS interface in order to select one or more of the products that the user of merchant device 124 offers, or is going to offer, at the establishment. After selecting all of the beverage products that the user of merchant device 124 needs, merchant device 124 transmits the selected list to server 120 via network 136 for processing by CMS 122.

In operation 204, CMS 122 receives a par value and on hand value for each item in the list received in operation 202. The par value and on hand value for each item may be stored as metadata associated with each item. The user of merchant device 124 may indicate a par value for each beverage product that they select in operation 202. The par value is a numerical value that represents the minimum number of units of a particular beverage product that the user wants to have available for use in the establishment. Further, the user may enter an on hand value for each beverage product included in the list received in operation 202. The on hand value represents the current number of units of a given beverage product that the user of merchant device 124 has at his or her establishment. In various embodiments, the par and on hand values may be received as part of the list in operation 202, or in a subsequent transmission via network 136. One skilled in the art will appreciate that each beverage product included in the list received in operation 202 has one par value and one on hand value for a single establishment.

In operation 206, CMS 122 identifies each product in the received list that has an on hand value less than the associated par value. Specifically, CMS 122 iterates through each product in the received list, and accesses the metadata associated with each product. CMS 122 may retrieve the par value and the on hand value from the associated metadata and compare the par value for each product to the on hand value for the same product. CMS 122 may generate a list of products, stored locally or remotely, which have an on hand value that is less than the associated par value.

In operation 208, CMS 122 builds an order list based, at least in part, on the par and on hand values. For example, CMS 122 may iterate through the list of products that have on hand values less than par values and build an order list that includes each of those products. In one embodiment, CMS 122 defaults the number of units to order to the difference between the on hand value and the par value. That is, CMS 122 automatically generates an order list that will bring the on hand value equal to the par value for each of the beverage products in the order. CMS 122 may confirm the order values with the user of merchant device 124 by transmitting a draft of the order to merchant device 124. A user may then remove beverage products/units to the order, add beverage products/units to the order, or otherwise modify the order before confirming that the number of units for each beverage product included on the order is correct. As discussed below, the user of merchant device 124 may also select one or more promotional offers made available by other entities using inventory management and acquisition system 100 to be applied to the order. Once the user of merchant device 124 is satisfied with the products, units, and promotions included in the order, merchant device 124 transmits the order to CMS 122.

In operation 210, CMS 122 receives promotional offer selections from merchant device 124. As discussed above, a user of merchant device 124 may select one or more promotional offers to apply to his or her order. The selection of promotional offers may take place during confirmation and building of the order or subsequent to the confirmation of the contents of the order. In various embodiments, promotional offers are made available to various merchant devices in inventory management and acquisition system 100. In certain embodiments, supplier device 102, sales representative device 108 and/or distributor device 114 may generate one or more promotional offers and send the promotional offers to other devices within inventory management and acquisition system 100. For example, in one embodiment, a user of distributor device 114 may generate a promotional offer on a beverage product and transfer the promotional offer details using a publisher/subscriber architecture to one or more merchant devices (e.g. merchant device 124). In such an embodiment, merchant application 126 may include a graphical user interface for viewing and selecting promotional offers published by the distributor. Each promotional offer generated by a device within inventory management system may also be transferred to CMS 122 which maintains a list of all active promotional offers within inventory management and acquisition system 100.

In decision block 212, CMS 122 determines whether any current promotional offers exist and apply to any beverage products included in the order. Specifically, decision block 212 provides a check which ensures that merchants are not missing promotions that are currently available. For example, CMS 122 iterates through each beverage product included in the order and compares it to the list of beverage products which have current promotional offers available. If CMS 122 locates a beverage product in the order for which a promotional offer is available, but not applied (decision block 212, YES branch), then CMS 122 transmits an alert to merchant device 124 that a promotional offer has been missed (operation 216). If CMS 122 determines that the order has not missed any active promotional offers (decision block 212, NO branch), then CMS 122 finalizes and submits the order by, for example, transmitting the order to distributor device 114 and/or sales rep device 108.

Figure 3:
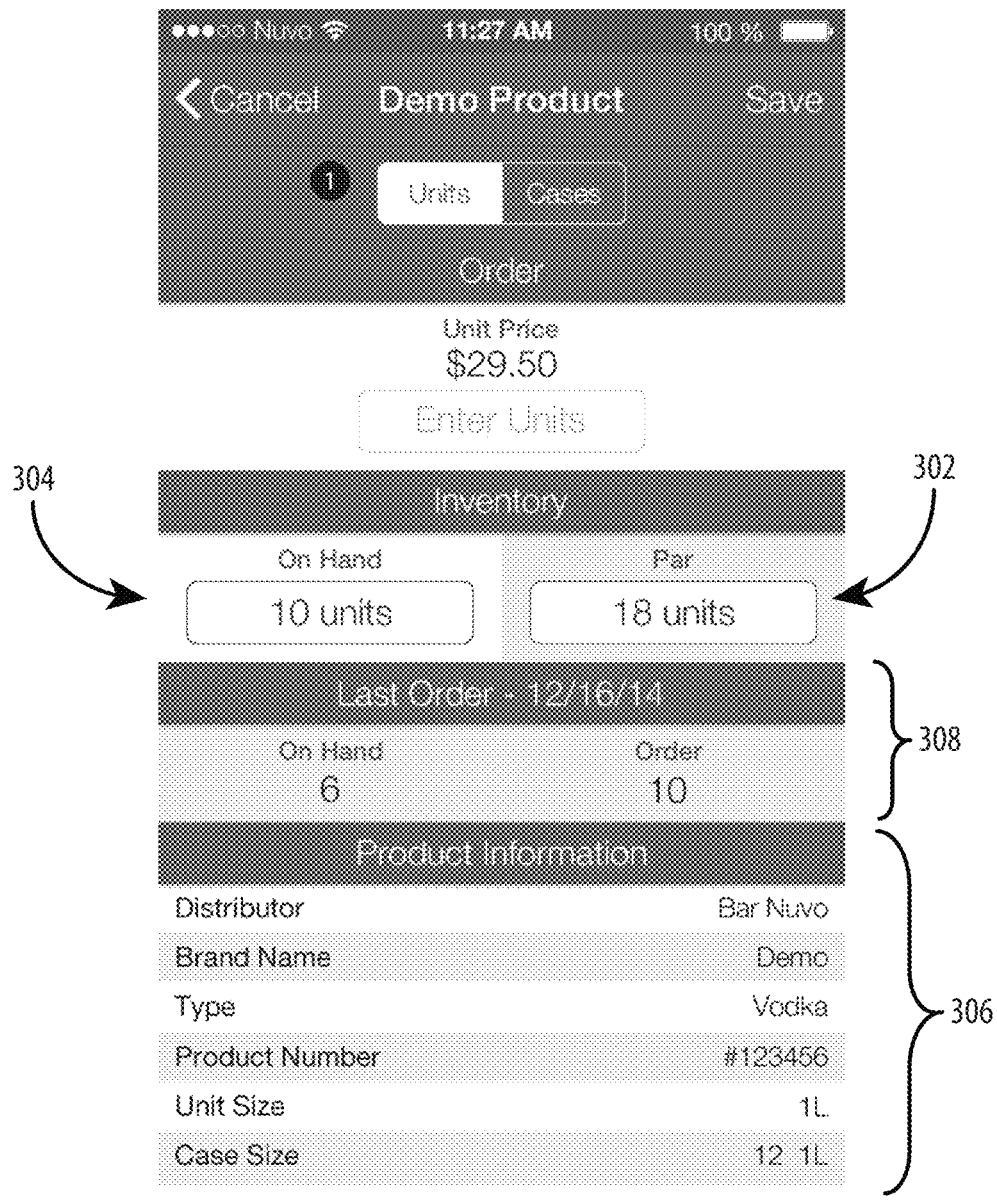
FIG. 3 is an example screenshot of a mobile application, in accordance with the embodiment of FIG. 2.

FIG. 3 is an example screenshot of a mobile application. FIG. 3 shows order information for a single beverage product. Specifically, FIG. 3 depicts the par value 302, the on hand value 304, previous order information 308 describing the most recent order placed, and product information 306 for the selected beverage product.

Figure 4:
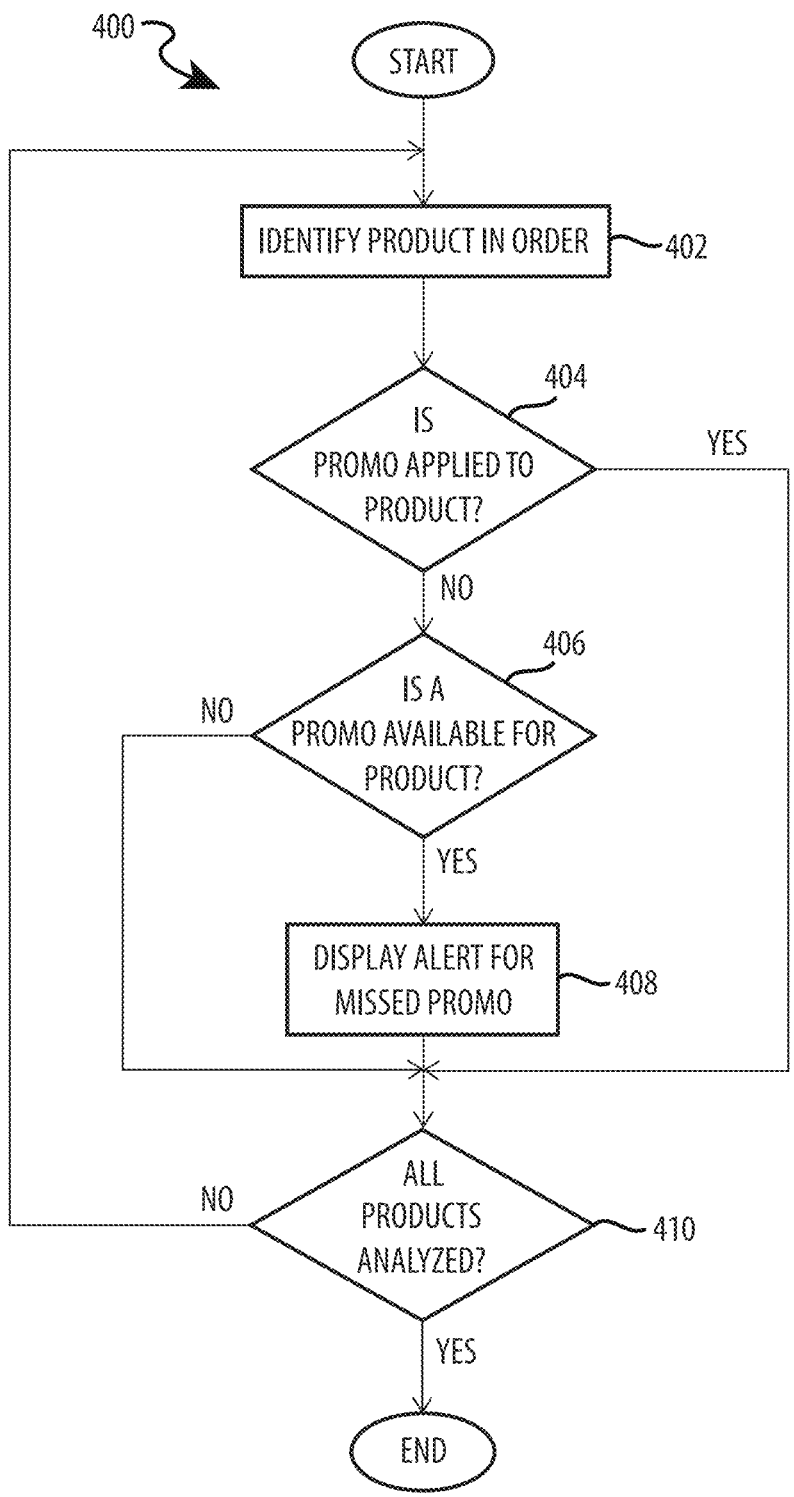
FIG. 4 is a flowchart depicting operations for alerting a merchant to a potentially missed promotion.

FIG. 4 is a flowchart depicting operations, generally designated 400, for alerting a merchant to a potentially missed promotion.

In operation 402, CMS 122 identifies a beverage product in a received order. For example, CMS 122 may iterate through each beverage product in the received order in the order in which the products appear on the order. In decision block 404, CMS 122 determines whether a promotional offer is applied to the identified product. CMS 122 may examine metadata associated with the identified item, in which may be stored a tag indicating that a promotional offer is or is not applied to the identified beverage product. If CMS 122 determines that a promotional offer is applied to the identified beverage product (decision block 404, YES branch), then CMS 122 determines whether all beverage products in the order have been analyzed in operation 410, discussed in further detail below. If CMS 122 determines that no promotional offer is applied to the identified beverage product (decision block 404, NO branch), then CMS 122 determines whether a promotion is available for the product in decision block 406.

In decision block 406, CMS 122 determines whether a promotional offer is currently available for the identified beverage product. As discussed above, CMS 122 may include a database of current promotional offers that may be periodically updated by CMS interfaces 106, 112, and 118 within supplier application 104, sales representative application 110, and distributor application 116, respectively. The promotional offer database within CMS 122 may be indexed by the beverage product to which it applies. Using such index, CMS 122 may quickly determine whether the identified beverage product has an available promotional offer that is not currently applied to the order. If CMS 122 determines that no promotional offer is currently available for the identified product (decision block 406, NO branch), then CMS 122 determines whether all beverage products in the order have been analyzed in decision block 410, discussed in further detail below. If CMS 122 determines that a current promotional offer is available for the identified beverage product (decision block 406, YES branch), then CMS 122 transmits an alert to merchant device 124 via network 136 in operation 408. Merchant device 124 may then display the alert to a user and provide the opportunity to apply the missed promotion to the order. In decision block 410, CMS 122 determines whether all beverage products in the order have been analyzed. As discussed above, CMS 122 may iterate through each beverage product included in the order to determine whether a promotional offer may have been missed. If CMS 122 determines that all beverage products in the order have not been analyzed (decision block 410, NO branch), then CMS 122 identifies an unanalyzed beverage product in operation 402. If CMS 122 determines that all beverage products in the order have been analyzed (decision block 410, YES branch), then CMS 122 terminates operations 400 and prepares the order for submission to the proper entity in inventory management and acquisition system 100.

Figure 5:
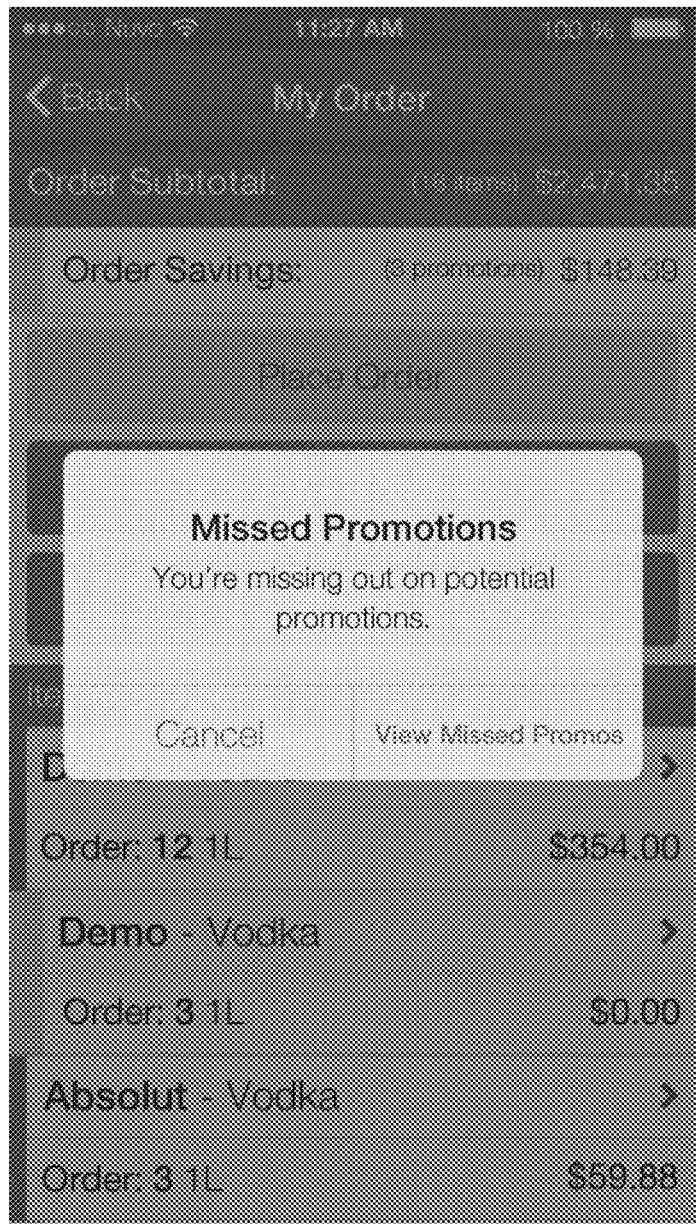
FIG. 5 is an example screenshot of a missed promotion alert, in accordance with the embodiment of FIG. 4.

FIG. 5 is an example screenshot of a missed promotion alert.

Figure 6:
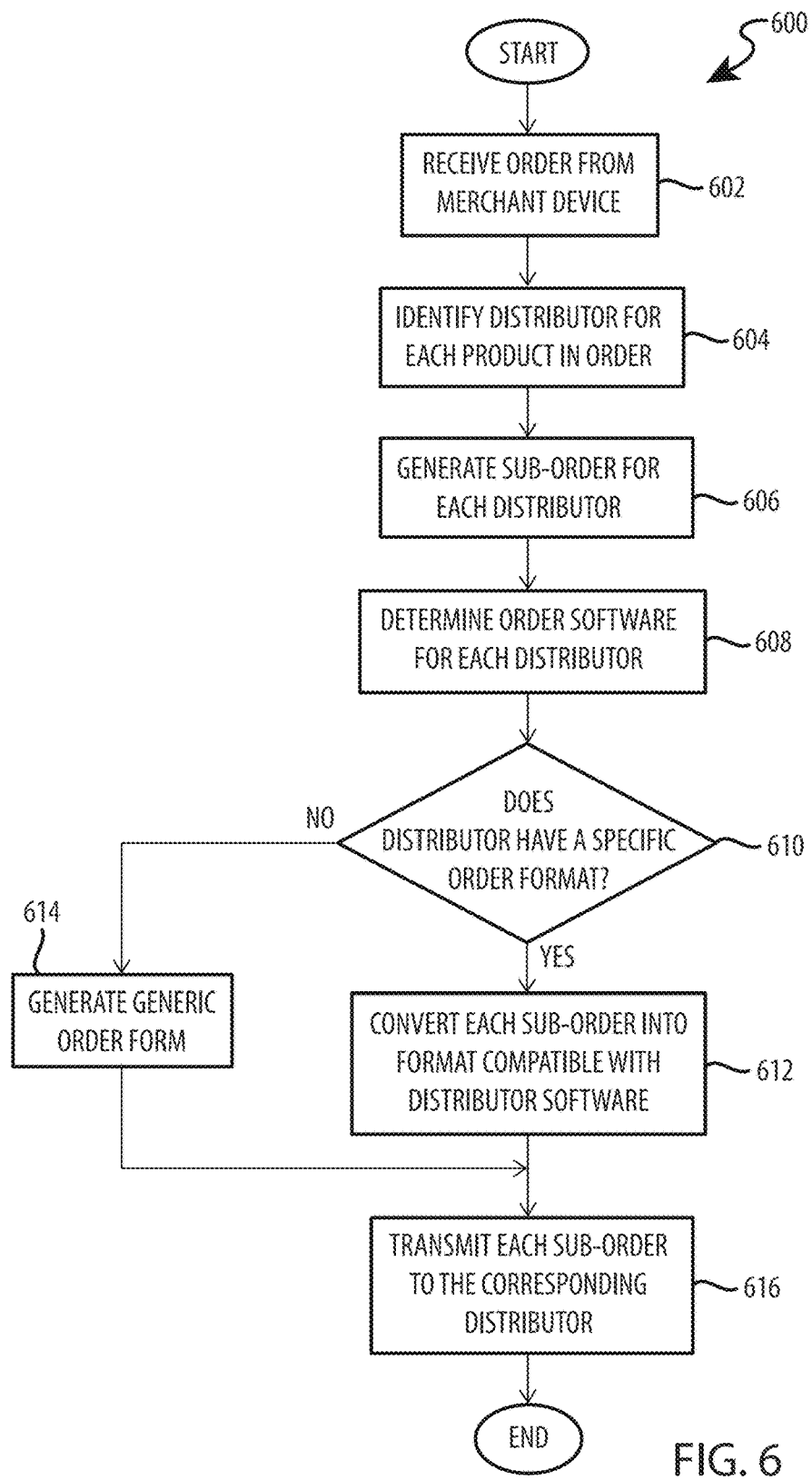
FIG. 6 is a flowchart depicting operations for placing an order of beverage products.

FIG. 6 is a flowchart depicting operations, generally designated 600, for placing an order of beverage products. The embodiment described in FIG. 6 recognizes that, in the interest of convenience, merchants may wish to submit a single order of all of the beverage products that they require at a given time. However, the complete list of beverage products may include a number of distributors and other entities that may have differing formatting and software compatibility requirements. Operations 600 provide an automated method for submitting an order that includes beverage products for multiple distributors/suppliers.

In operation 602, CMS 122 receives an order for a plurality of beverage products from merchant device 124 via network 136. Each beverage product in the order may have associated metadata with it. The associated metadata may include a variety of information, such as the distributor that provides the beverage product or promotional offers associated with the beverage product, order history information for each product, etc. In operation 604, CMS 122 identifies a distributor for each beverage product included in the received order. CMS 122 may determine the distributors based on, for example, user input, a pre-existing list of approved distributors for each beverage product, or location information (e.g., city, state, and/or county). Location information may be determined automatically using, for example, global positioning system information. In certain embodiments, each merchant may have existing relationships with a number of distributors that provide different products. In one embodiment, CMS 122 first determines whether a merchant has previously indicated which distributor should be used for a given product, and alternatively, if no distributor has been identified by the merchant, then CMS 122 selects a distributor that provides the given beverage product.

In operation 606, CMS 122 generates a sub order for each distributor identified in operation 604. In various embodiments, each sub-order may include one or more beverage products from the complete order, as any given distributor may provide distribution services for more than one beverage product. In general, CMS 122 generates a number of sub-orders based on the identified distributors, rather than a single order that entails all of the ordered beverage products.

In operation 608, CMS 122 determines the order software for each distributor. CMS 122 may include a database containing details on each distributor included in inventory management and acquisition system 100. In one embodiment, such a database may include information regarding the order specifications, such as the ordering software used by each distributor. In certain embodiments, CMS 122 may further include order templates for each distributor.

In decision block 610, CMS 122 determines whether each distributor has a specific order format that it uses. For example, each distributor may have a specific format used by its own internal ordering system. When a distributor registers with inventory management and acquisition system 100, the distributor may identify a specific format for orders which is compatible with its internal ordering software. Alternatively, inventory management and acquisition system 100 may automatically detect which ordering format the distributor uses. Some distributors may not have a preferred ordering format, or no specific order format may have been selected. If CMS 122 determines that the distributor does have a specified order format (decision block 610, YES branch), then CMS 122 converts each sub-order into a format compatible with the software used by the associated distributor in operation 612. If CMS 122 determines that the distributor does not have a specified order format (decision block 610, NO branch), then CMS 122 generates a generic order form in operation 614.

In operation 612, CMS 122 converts each sub-order into a format compatible with the software used by the associated distributor. For example, CMS 122 may use a template order associated with the distributor to convert the information contained in the order submitted by the merchant into a format compatible with the distributor ordering system. As such, the submitted order will automatically be compatible with the distributors system without requiring the merchant to customize each order to a given distributor as well as submit separate orders for each distributor. In operation 616, CMS 122 transmits each sub-order to the corresponding distributor and/or the distributor's sales representative for processing and fulfillment. In various embodiments, CMS 122 may transmit one or more generic order forms, as generated in operation 614 and/or one or more distributor-specific order forms, as generated in operation 612. Orders transmitted in operation 616 may be time and date stamped.

Figure 7:
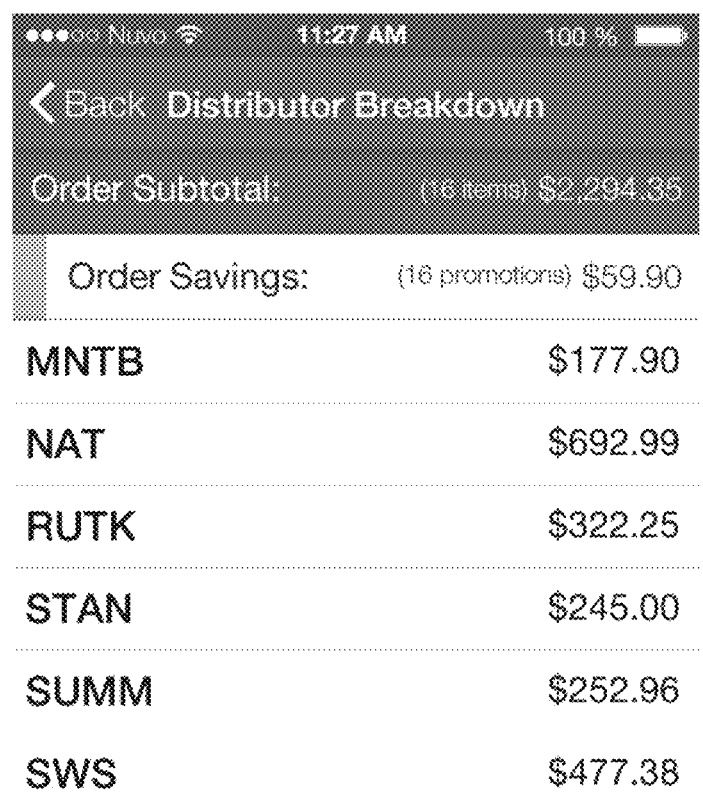
FIG. 7 is an example screenshot of a beverage product order by distributor in accordance with the embodiment of FIG. 6.

FIG. 7 is an example screenshot of a plurality of beverage product sub-orders by distributor, in accordance with the embodiment of FIG. 6. In certain embodiments, the list of beverage product sub-orders may include an indicator that specifies whether a sales representative for each distributor has confirmed receipt of the sub-order. Each indicator may include, for example, a phone number for the associated sales representative.

Figure 8:
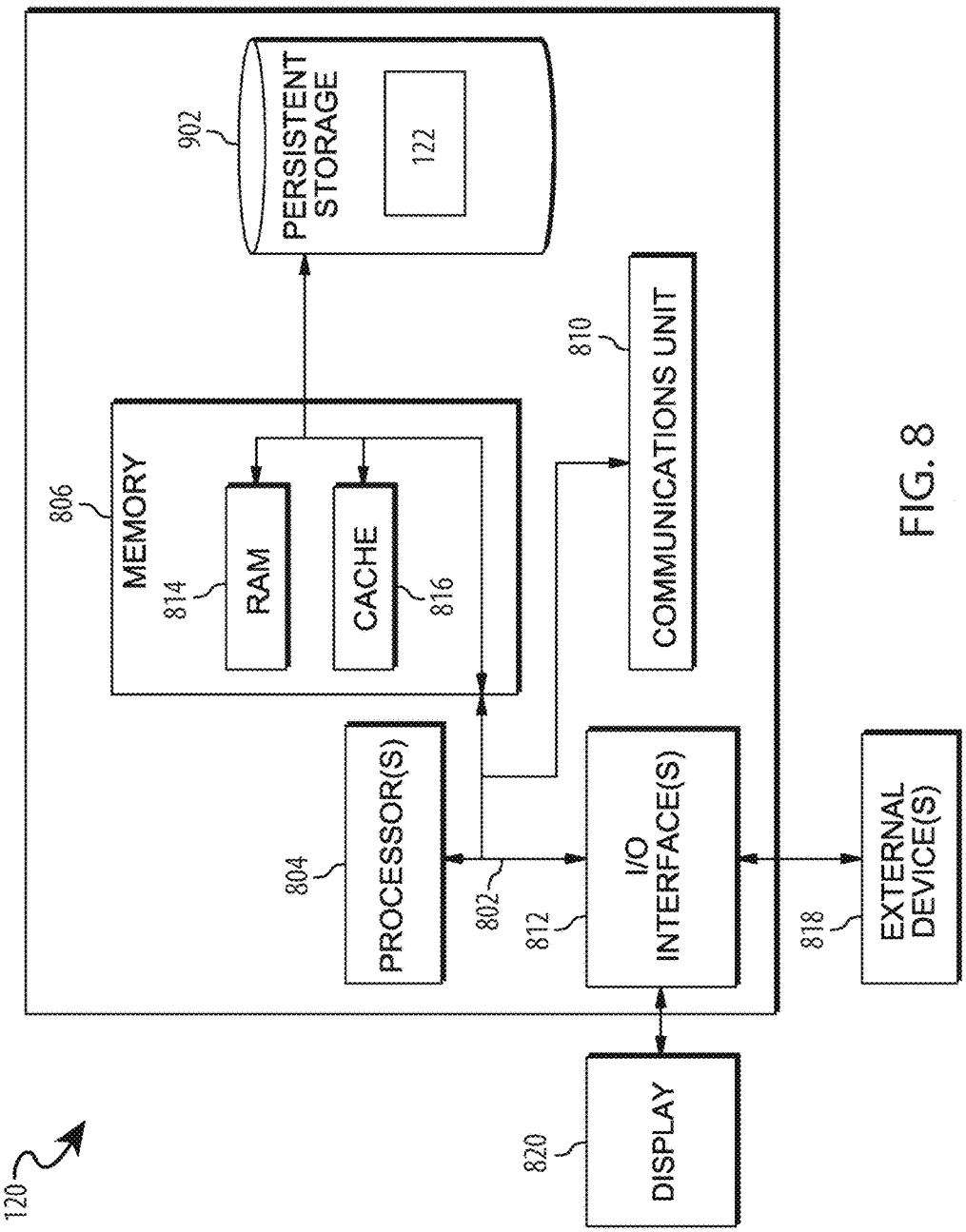
FIG. 8 is a functional block diagram depicting components of a server computer within the system of FIG. 1.
Figure 9:
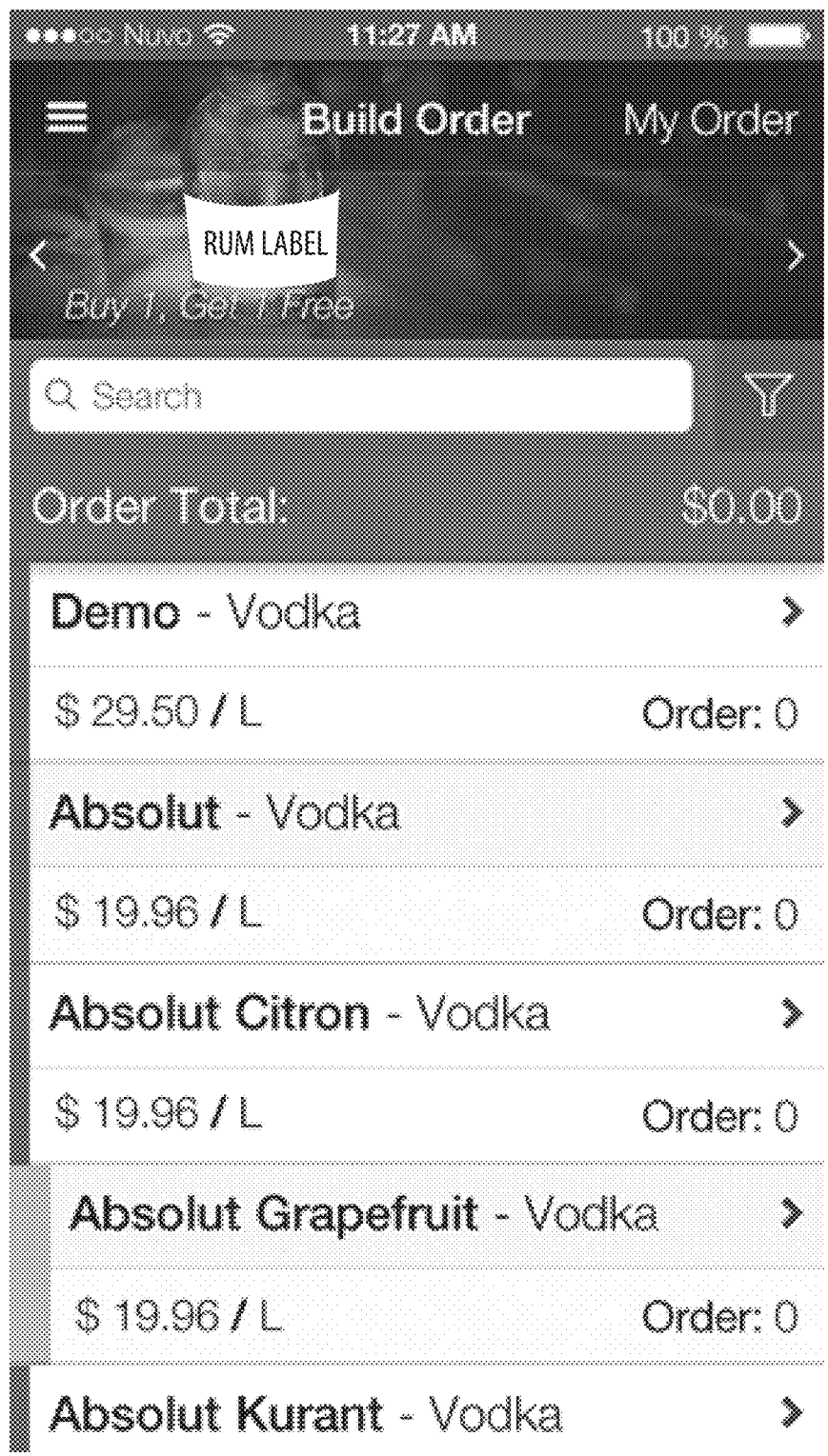
Figure 10:
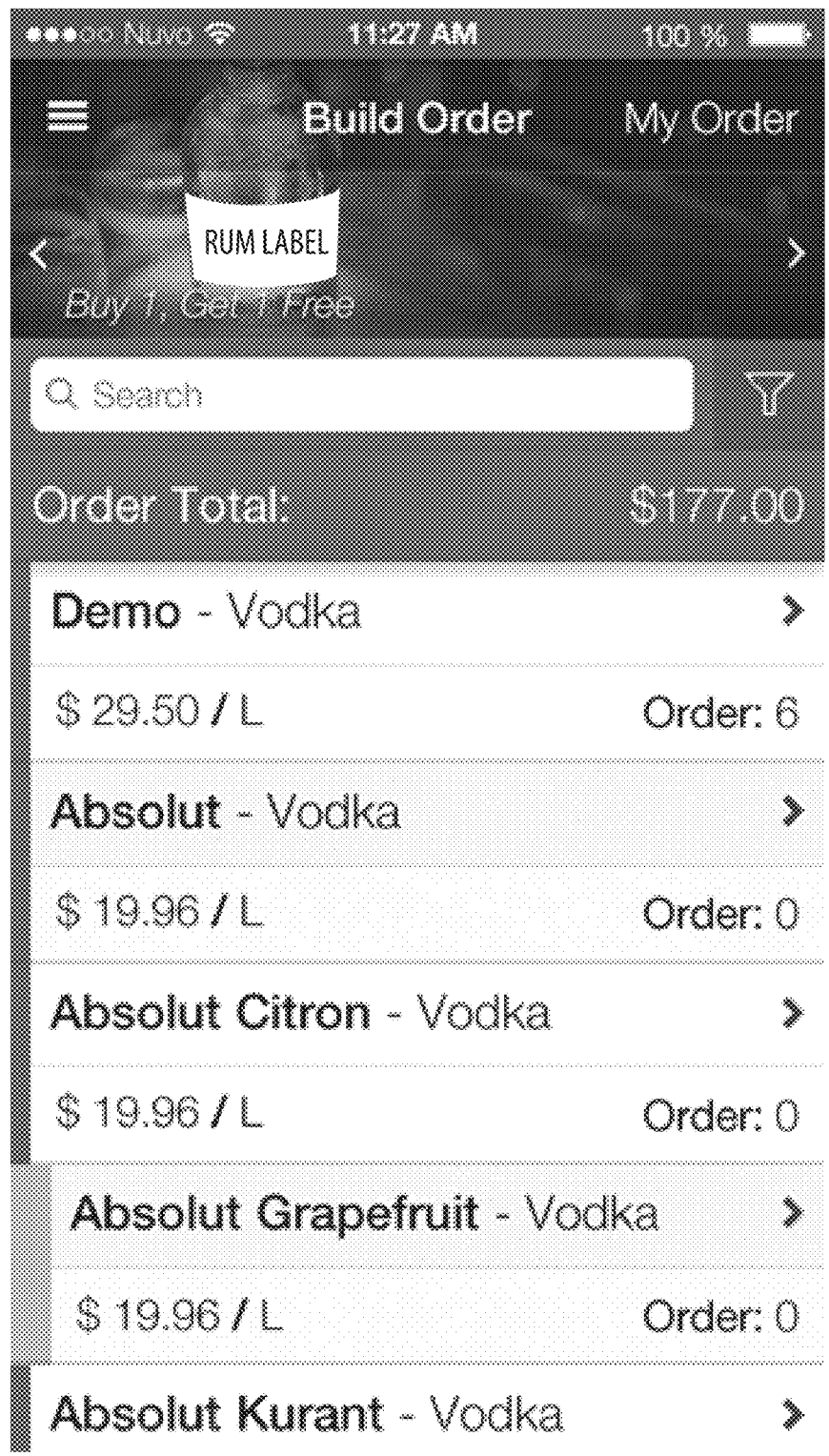
Figure 11:
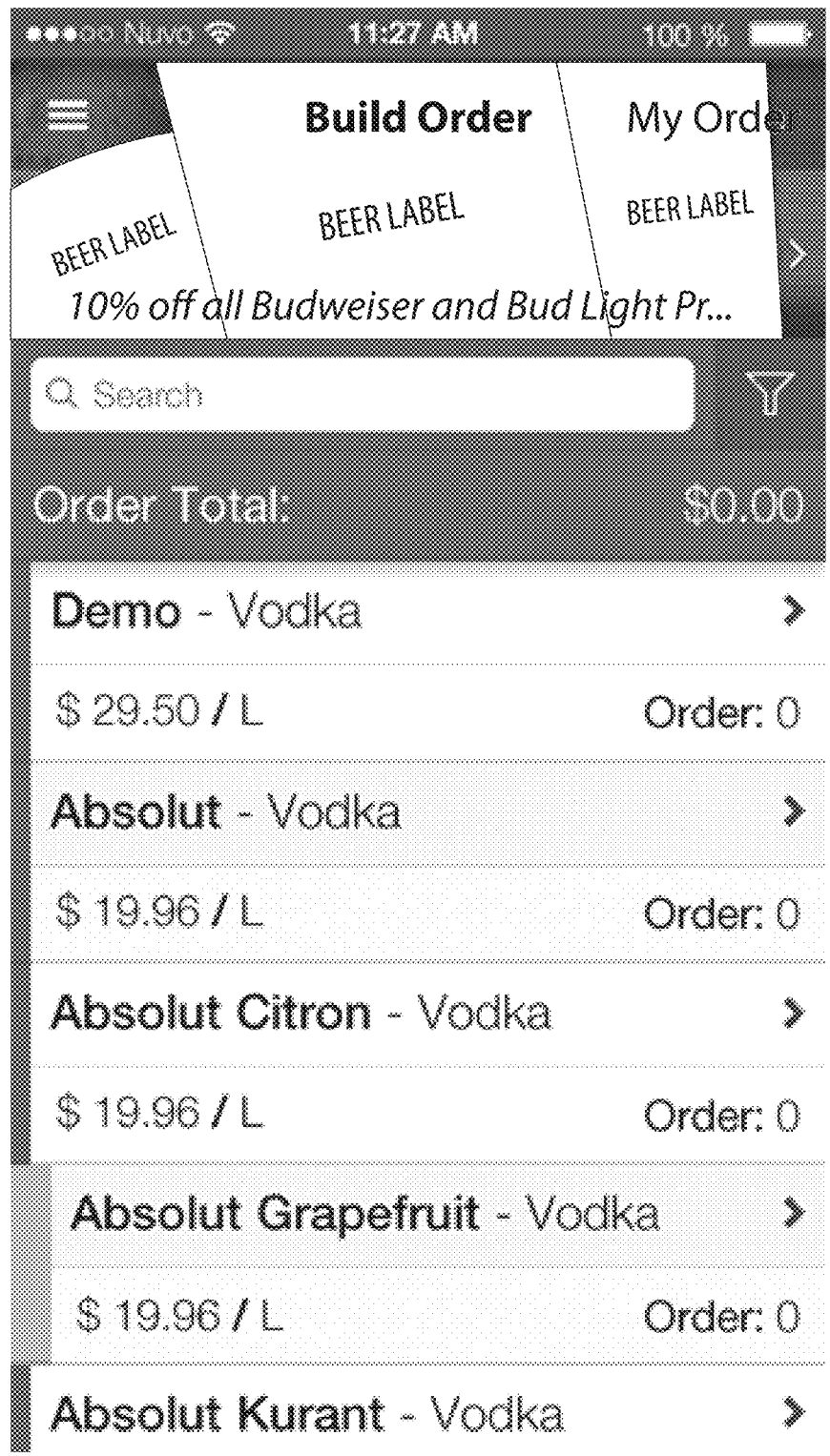
Figure 12:
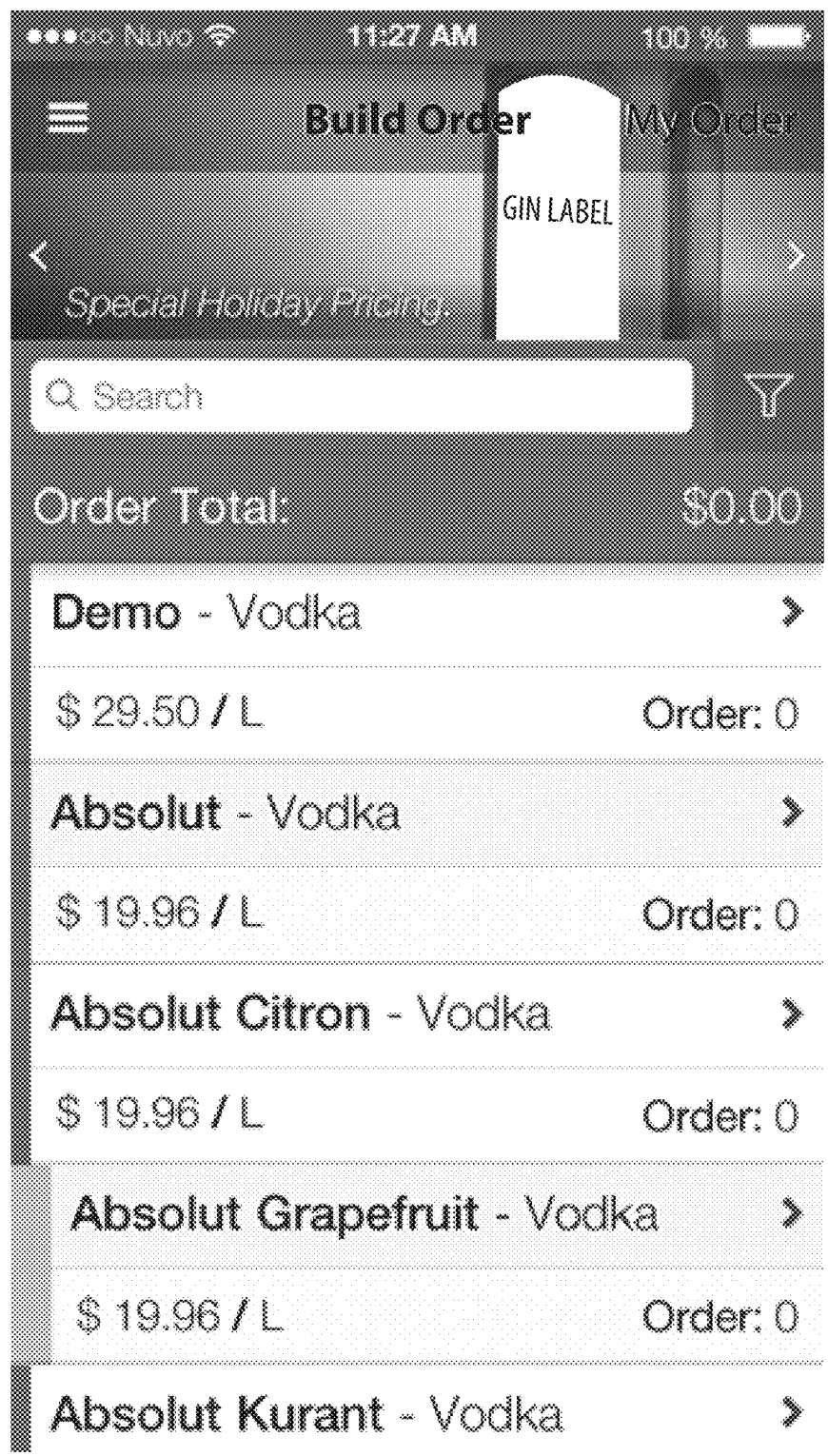
Figure 13:
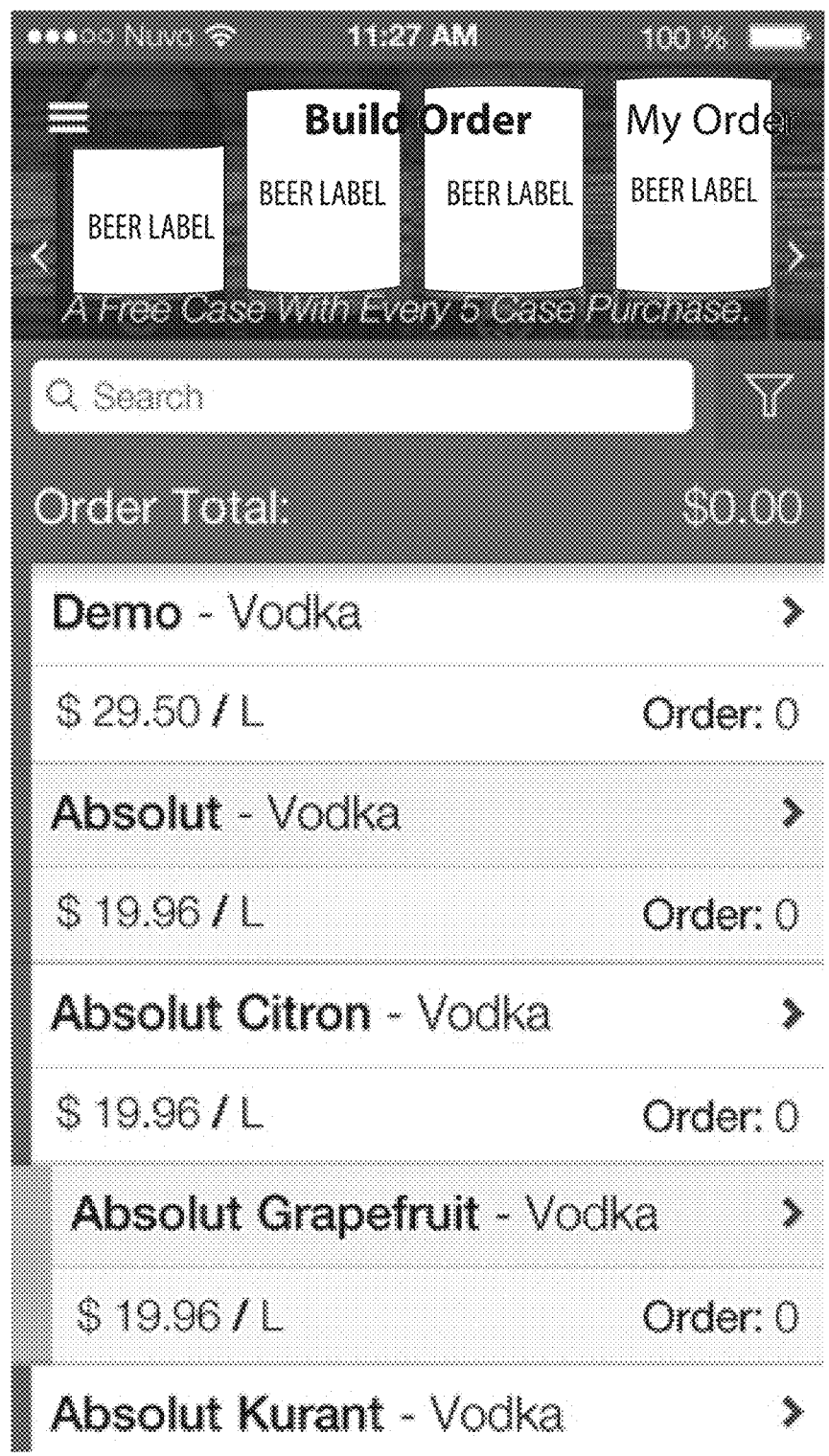
Figure 14:
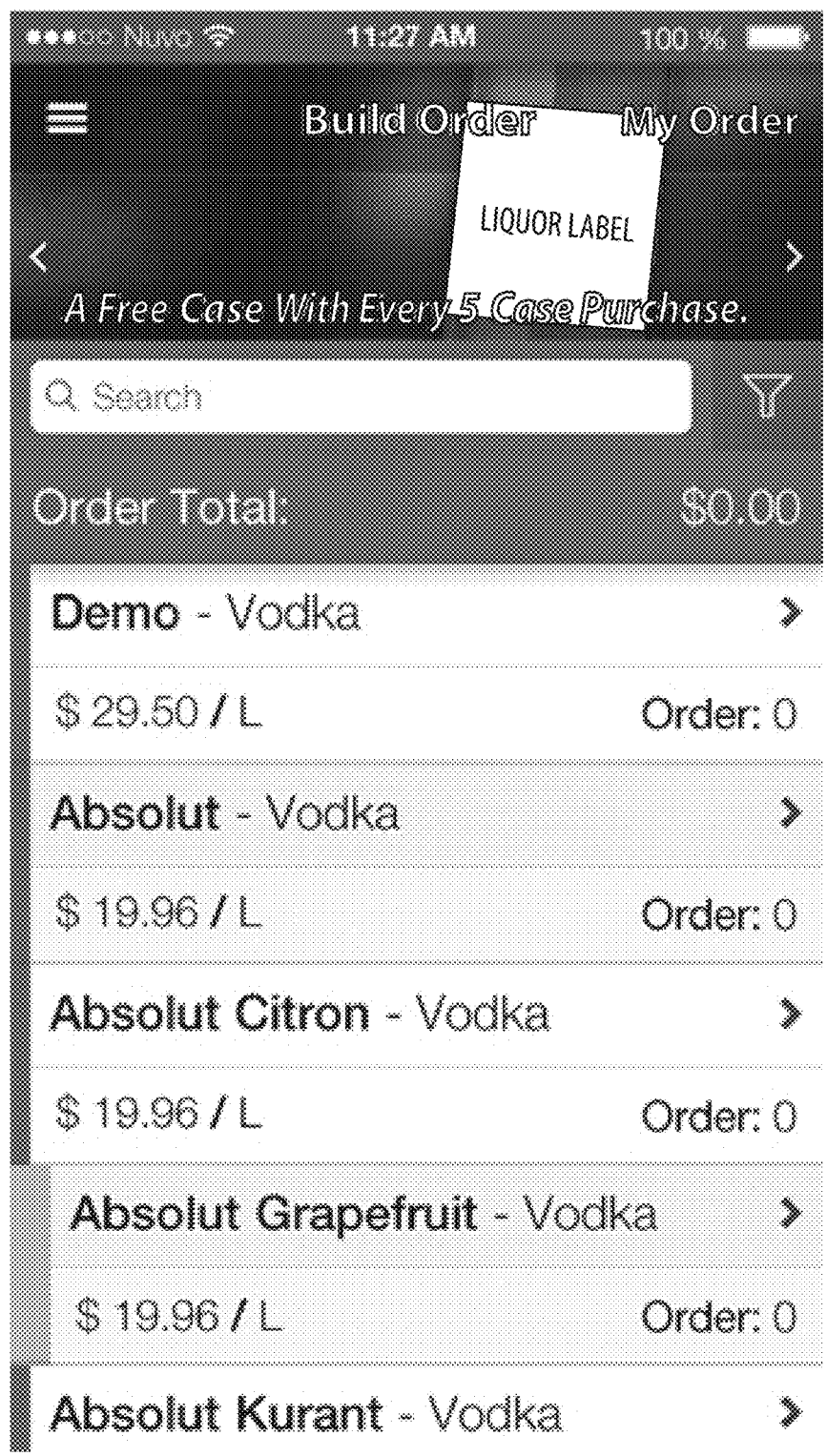
Figure 15:
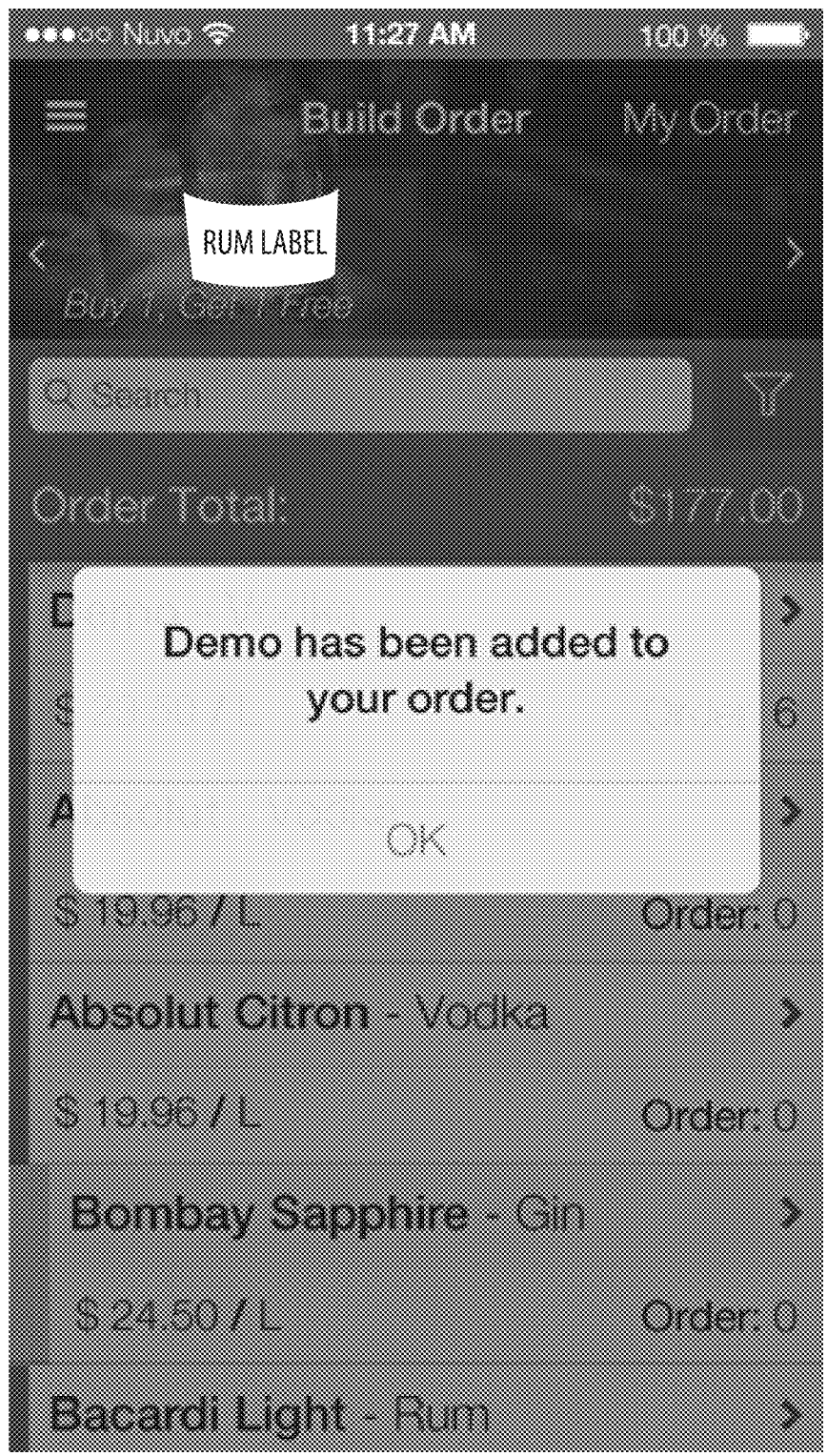
Figure 16:
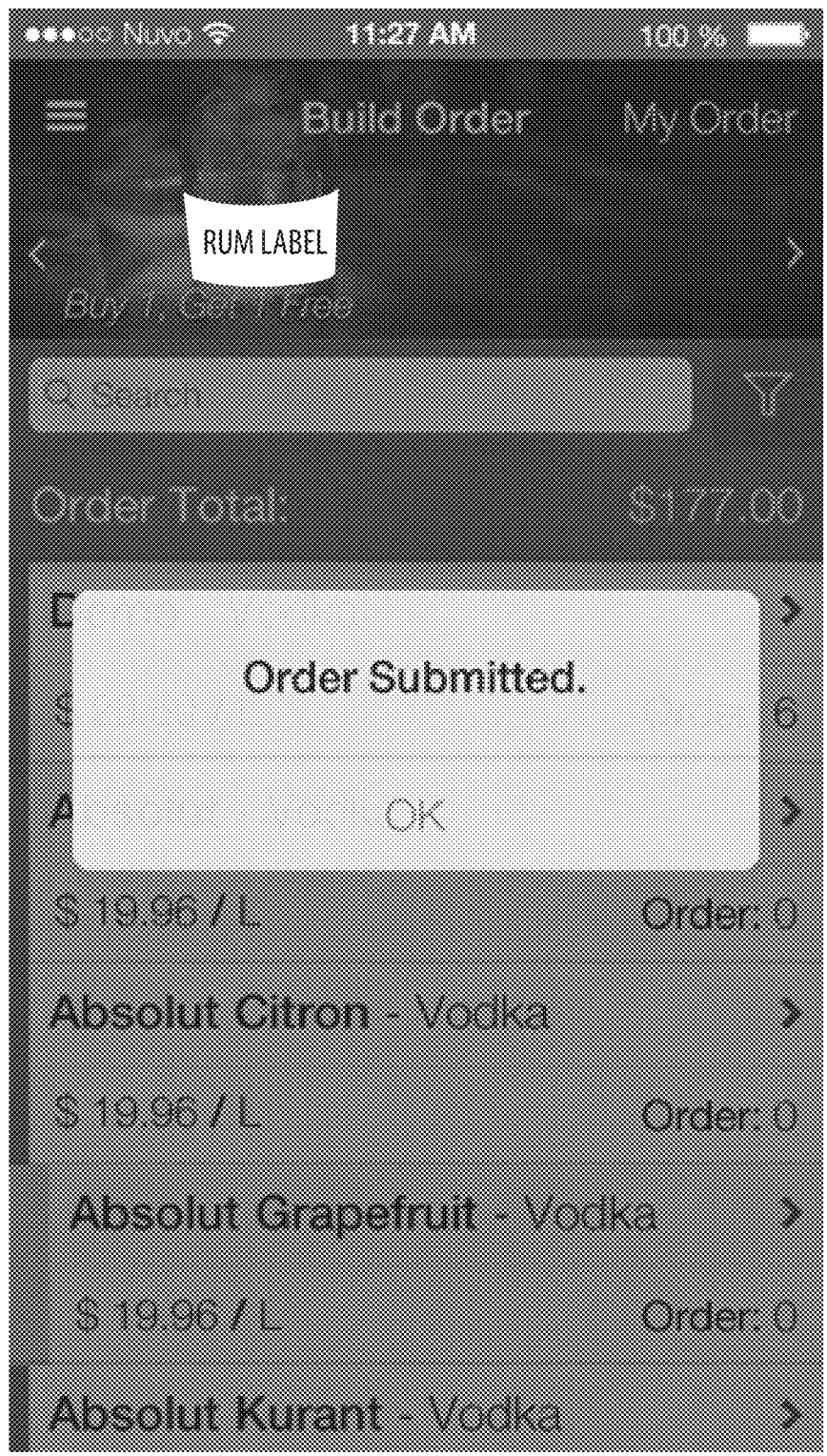
Figure 17:
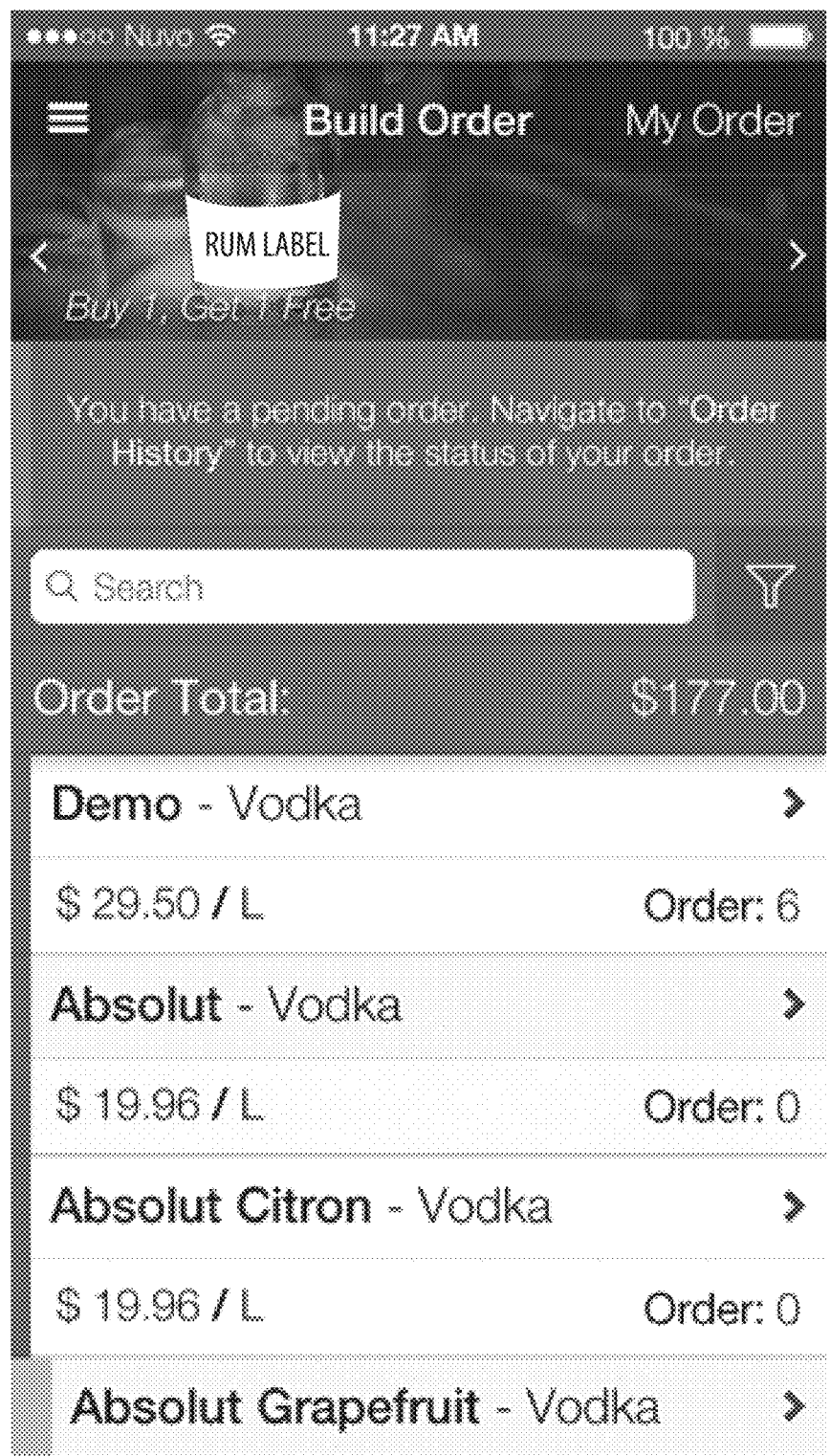
Figure 18:
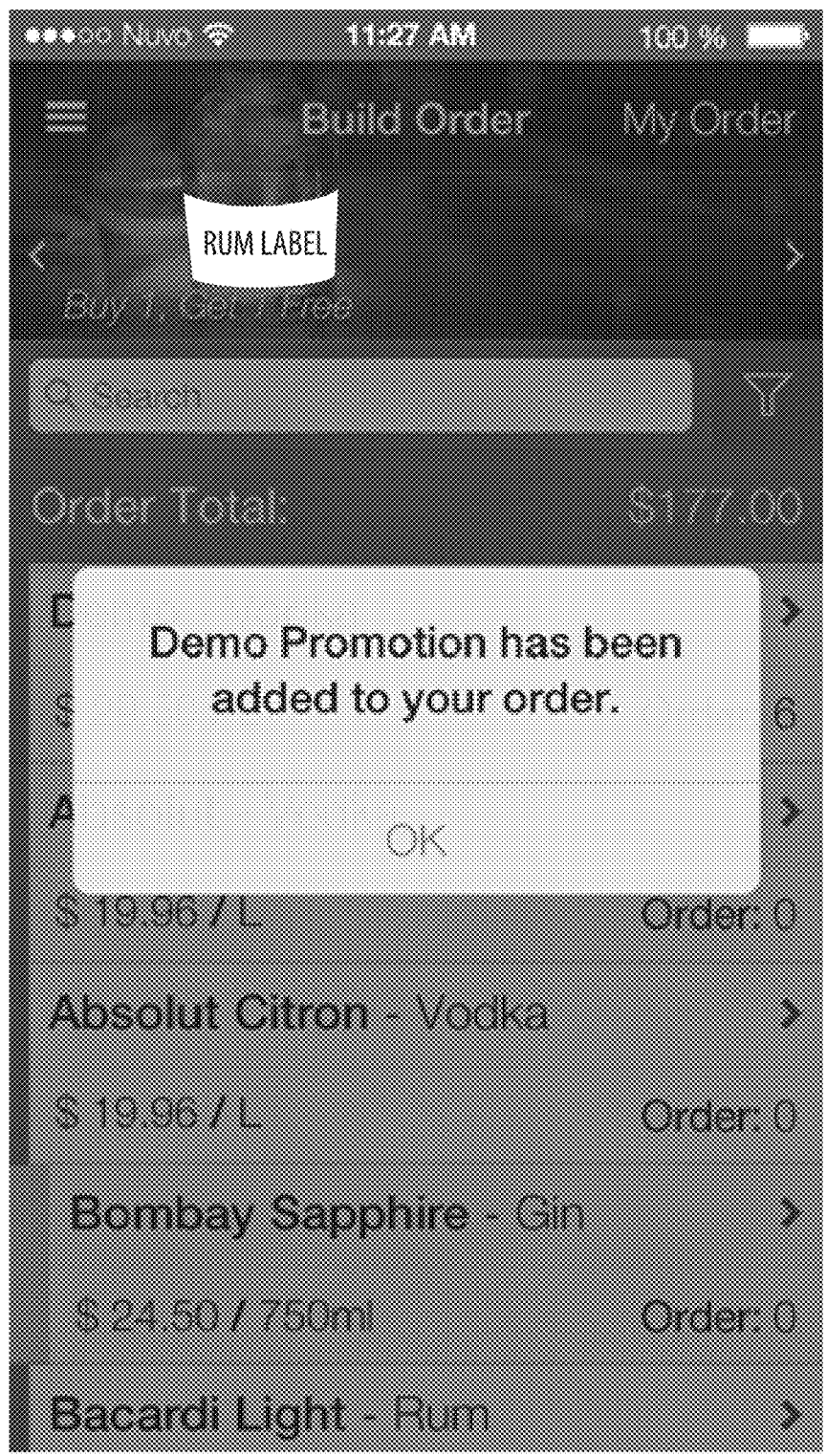
Figure 19:
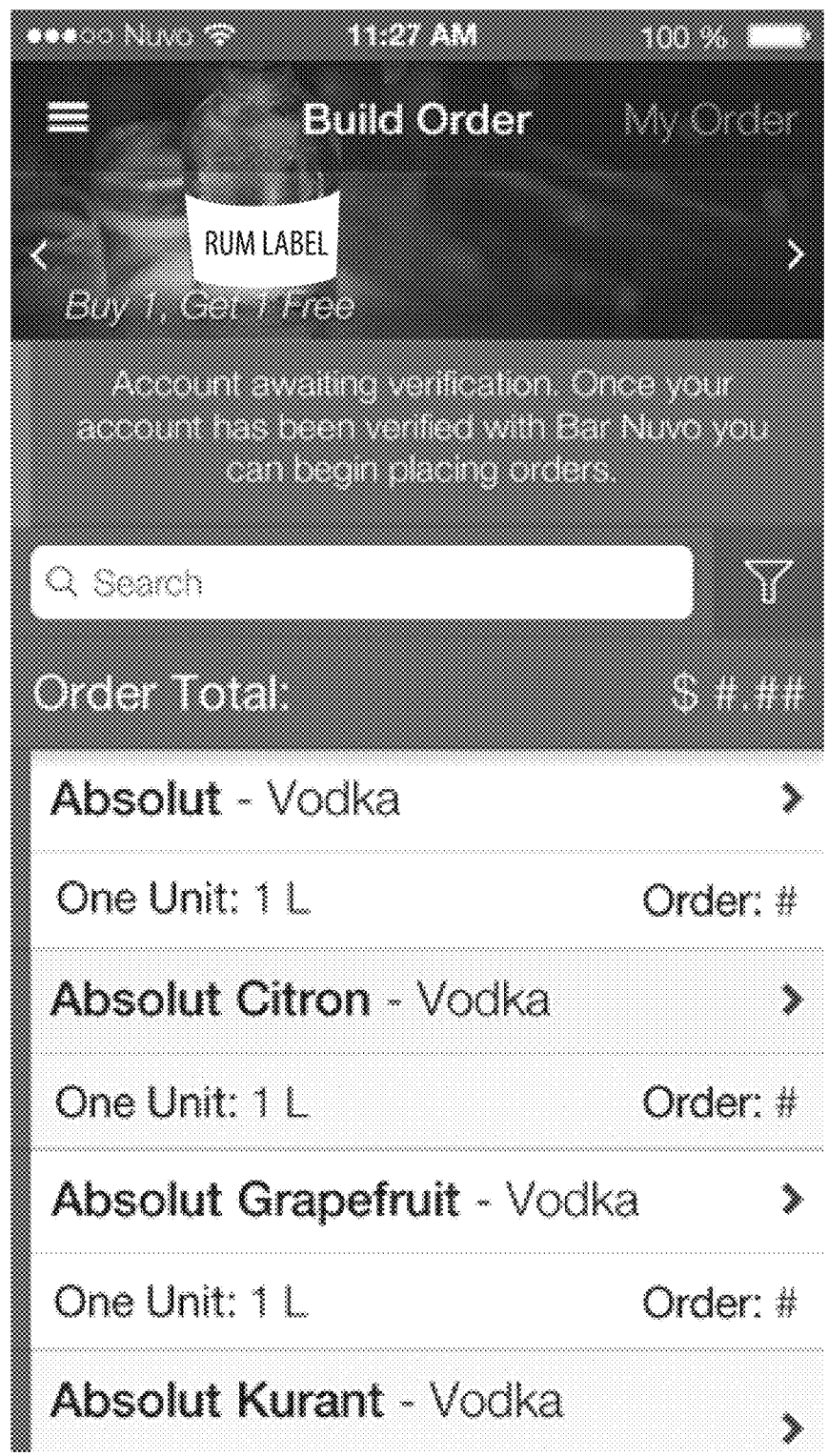
Figure 20:
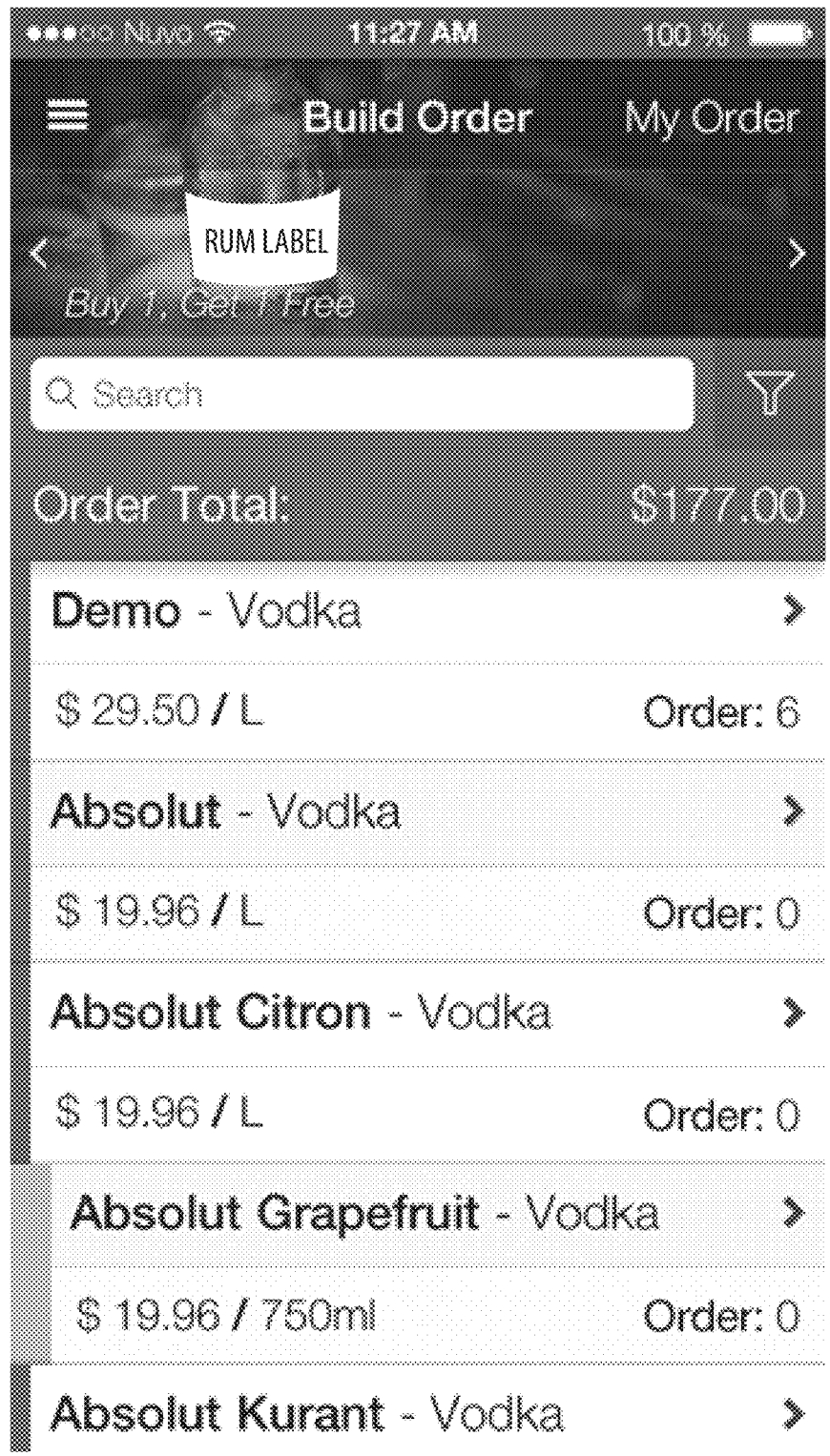
Figure 21:
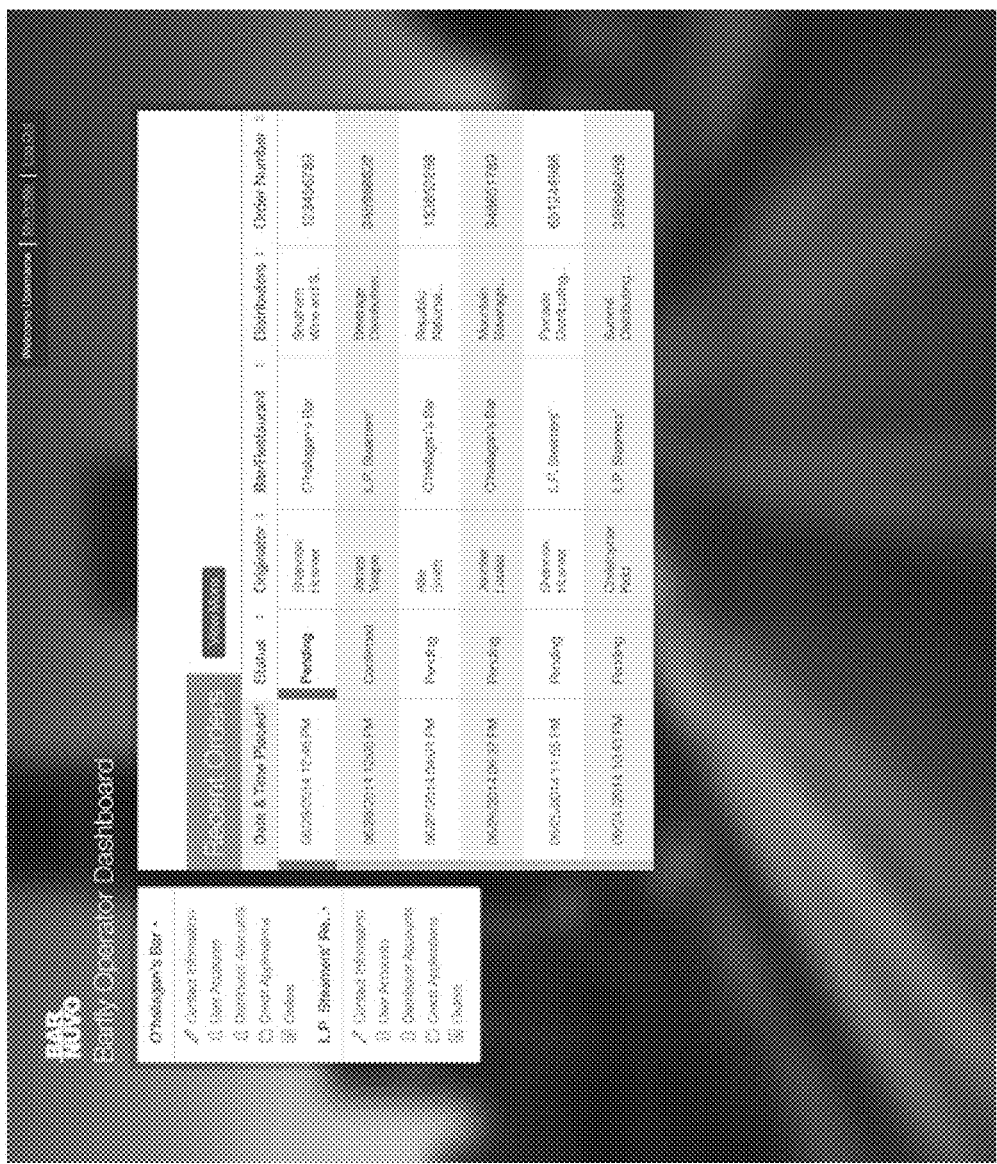
Figure 22:
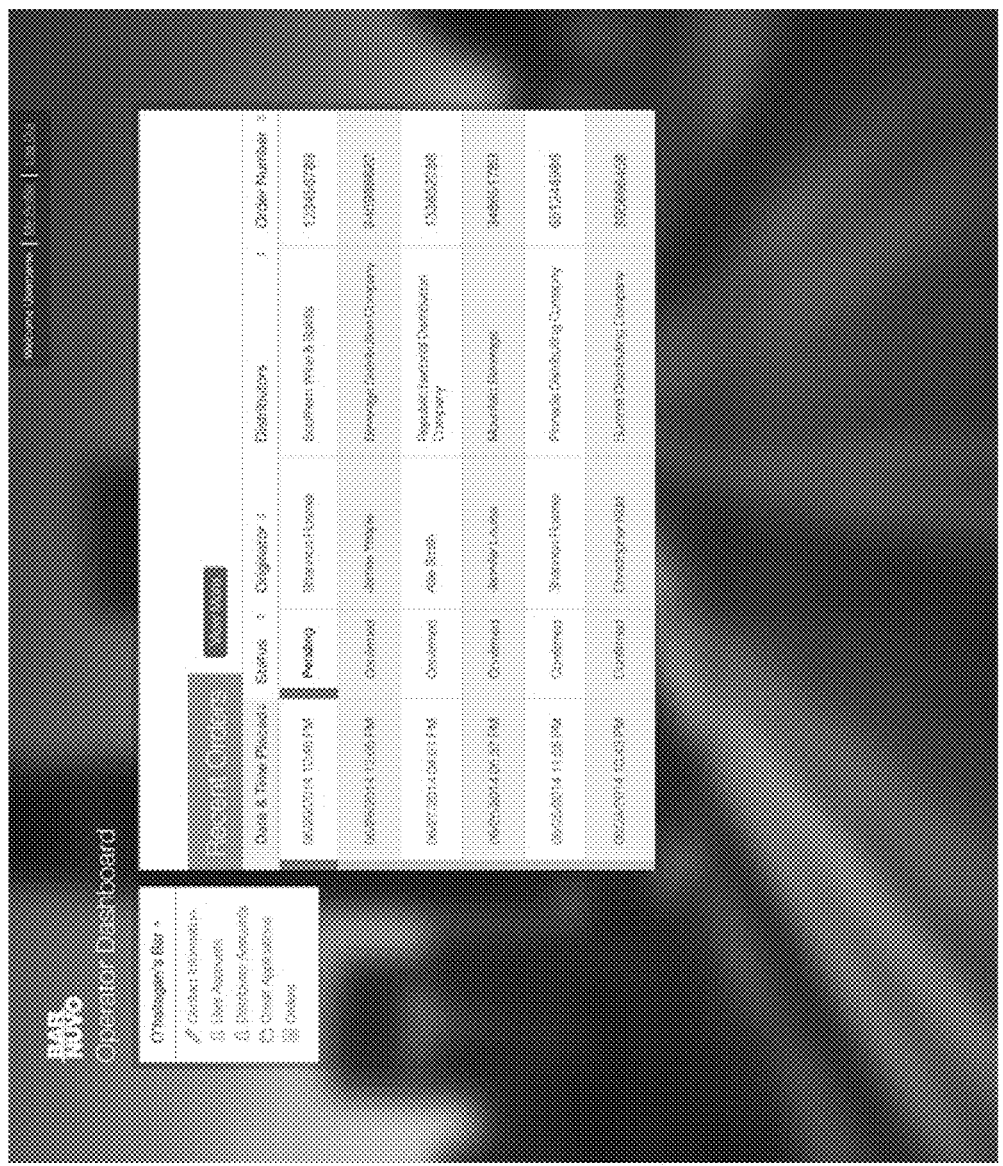
Figure 23:
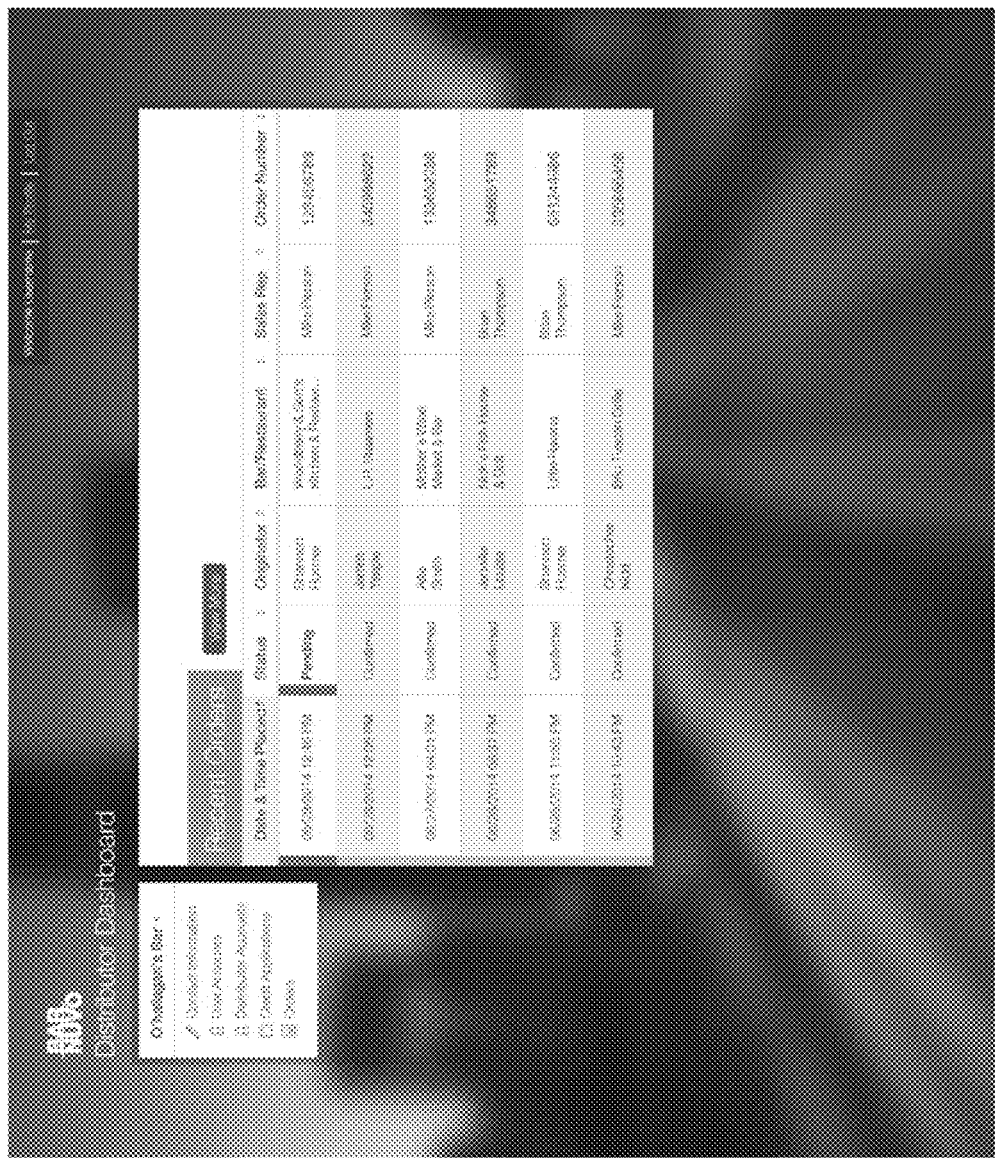
Figure 24:
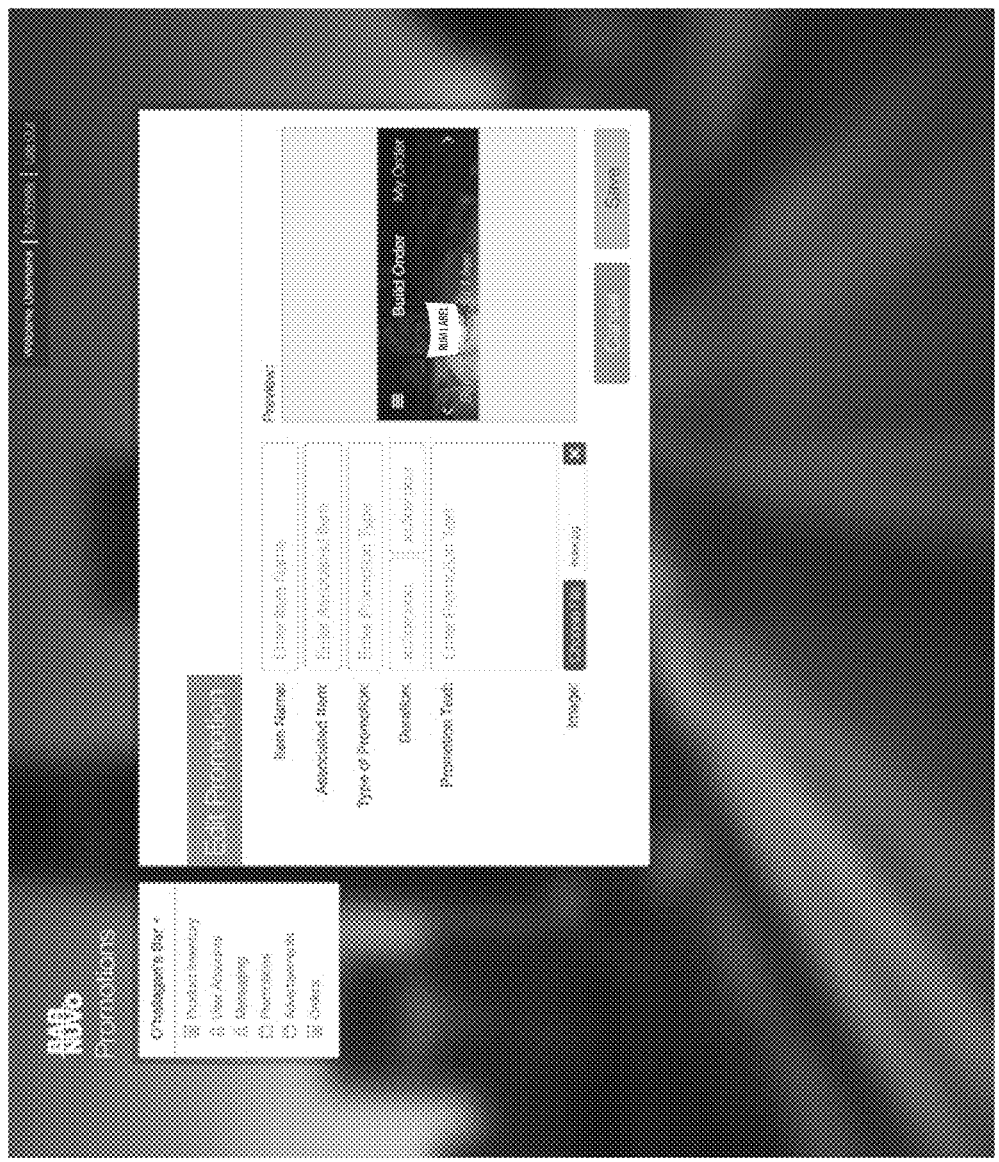
Figure 25:
Figure 26:
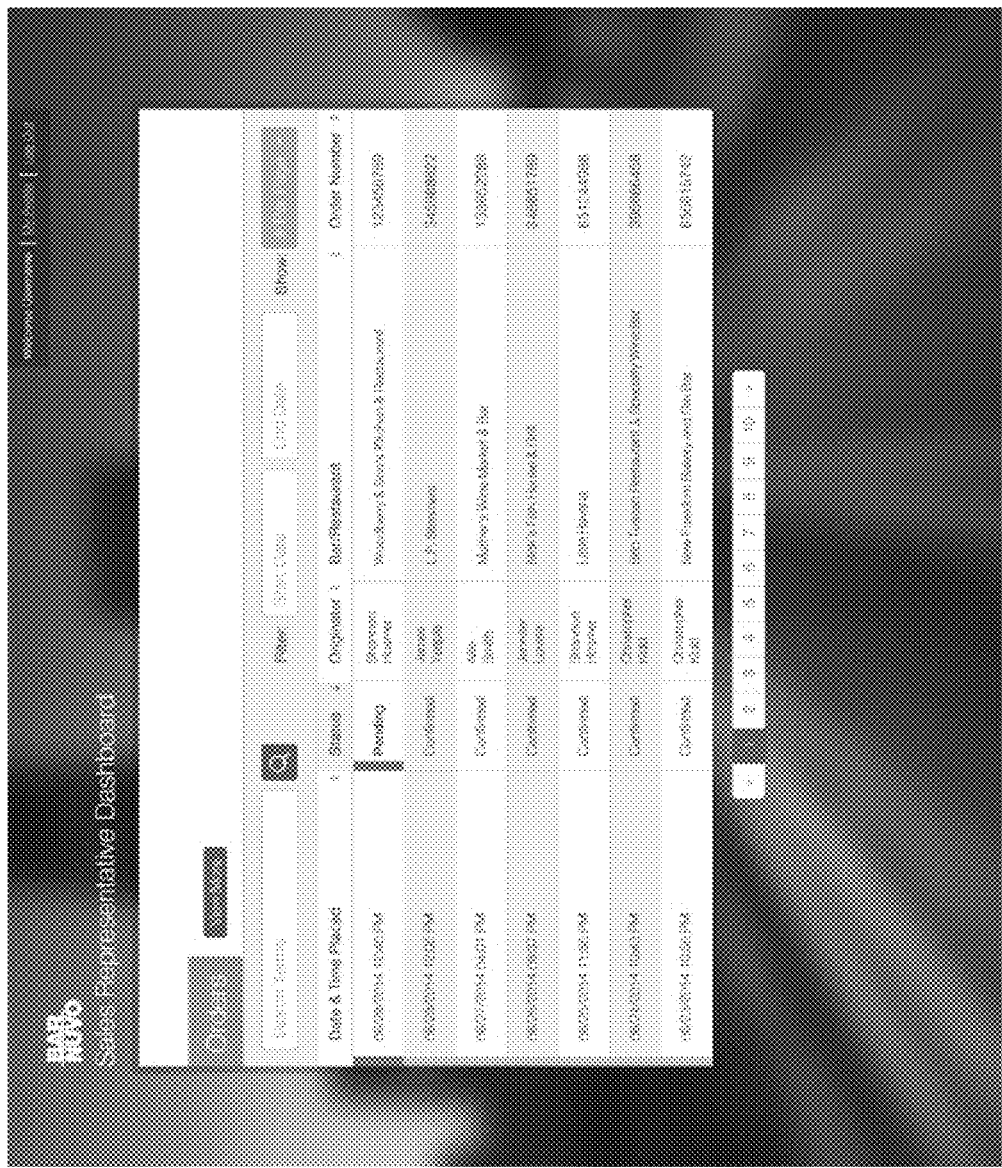
Figure 27:
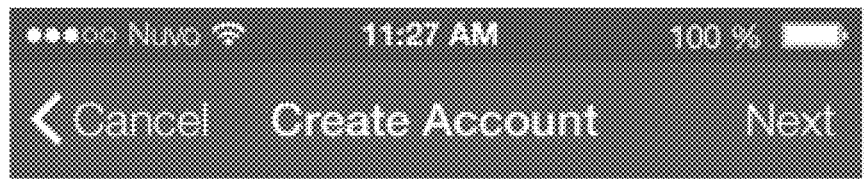
Figure 28:
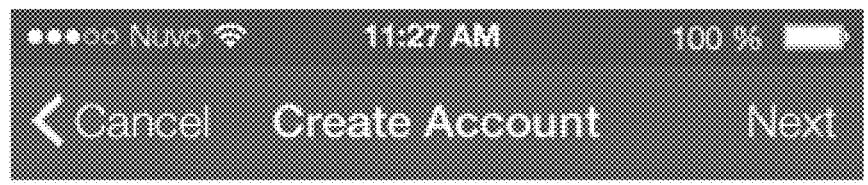
Figure 29:
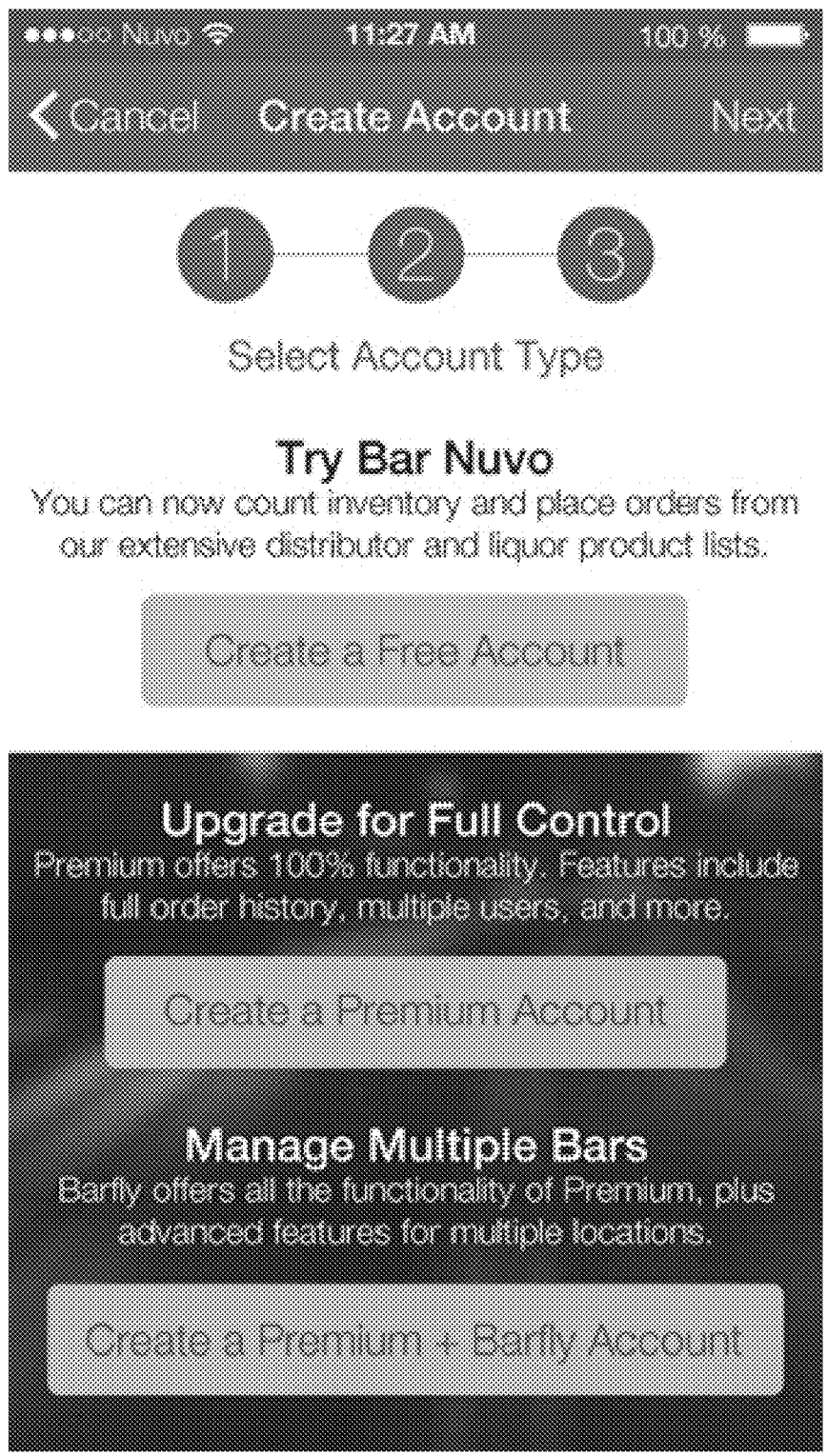
Figure 30:
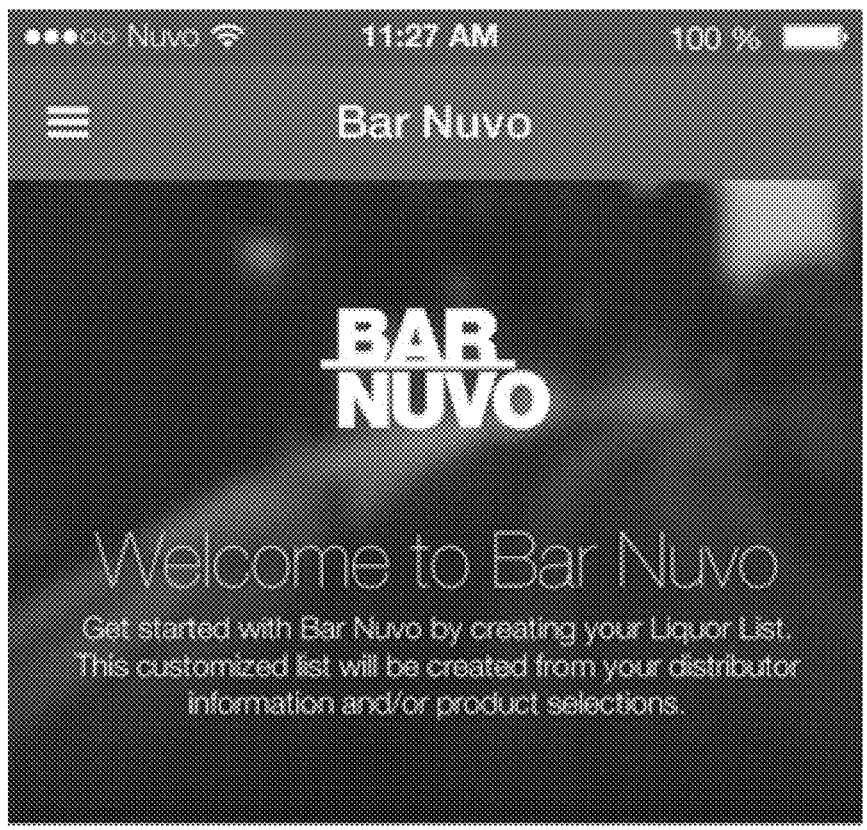
Figure 32:
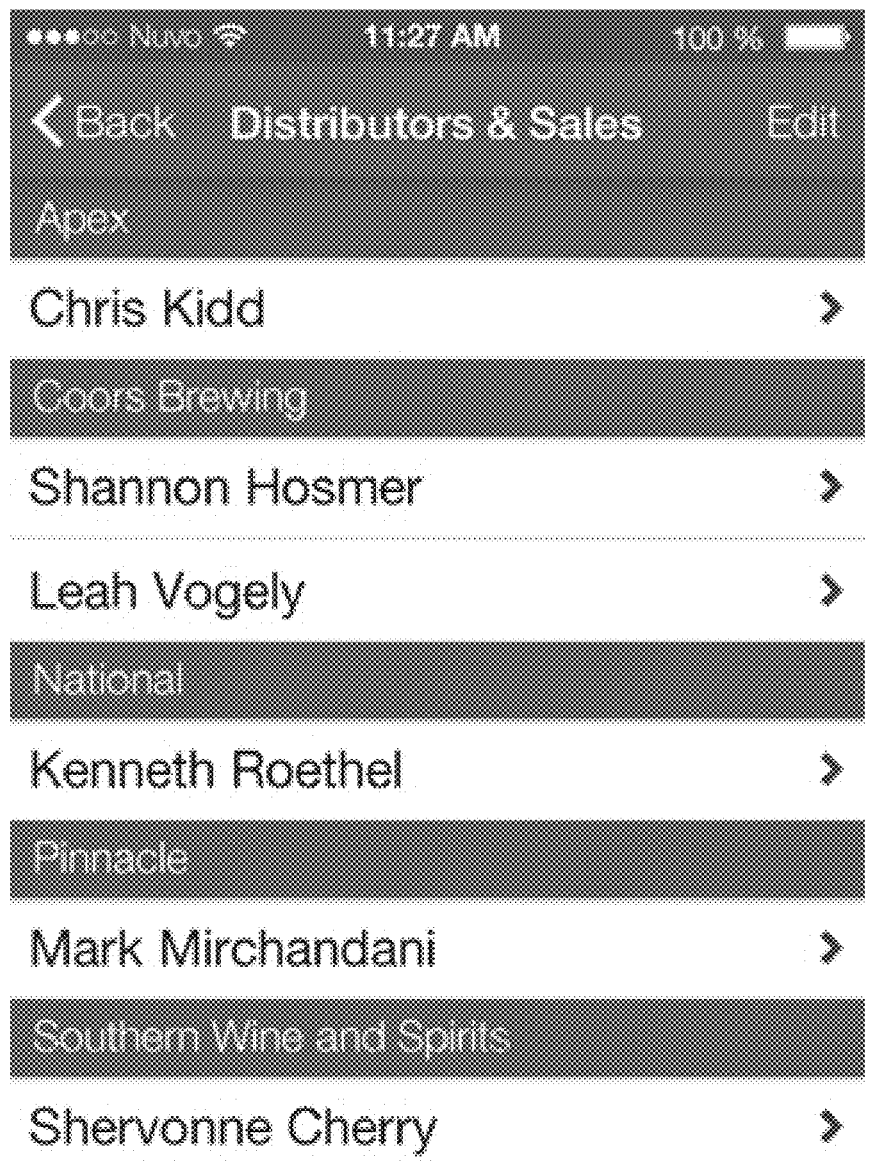
Figure 33:
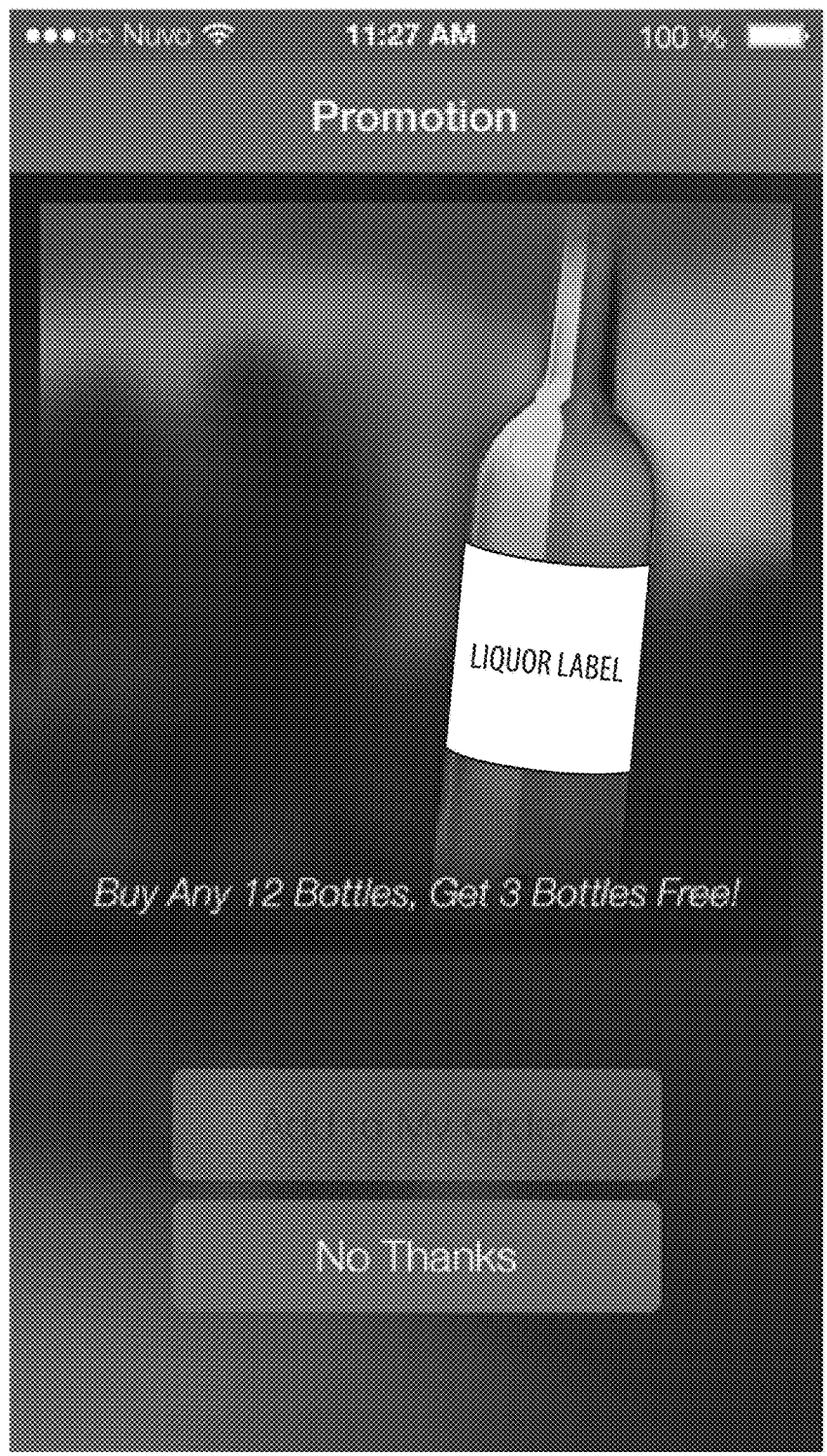
Figure 34:
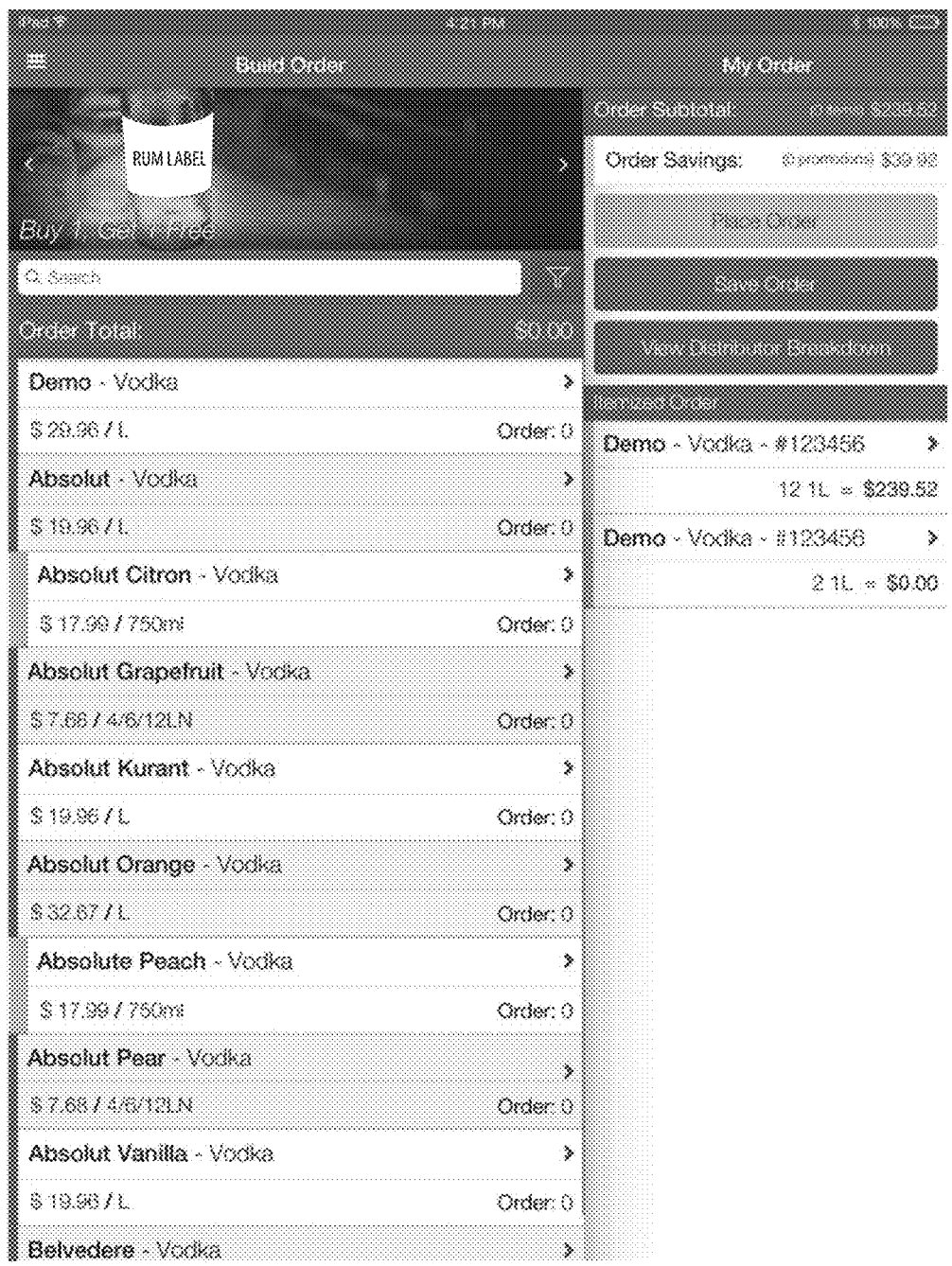
Figure 35:
Figure 36:
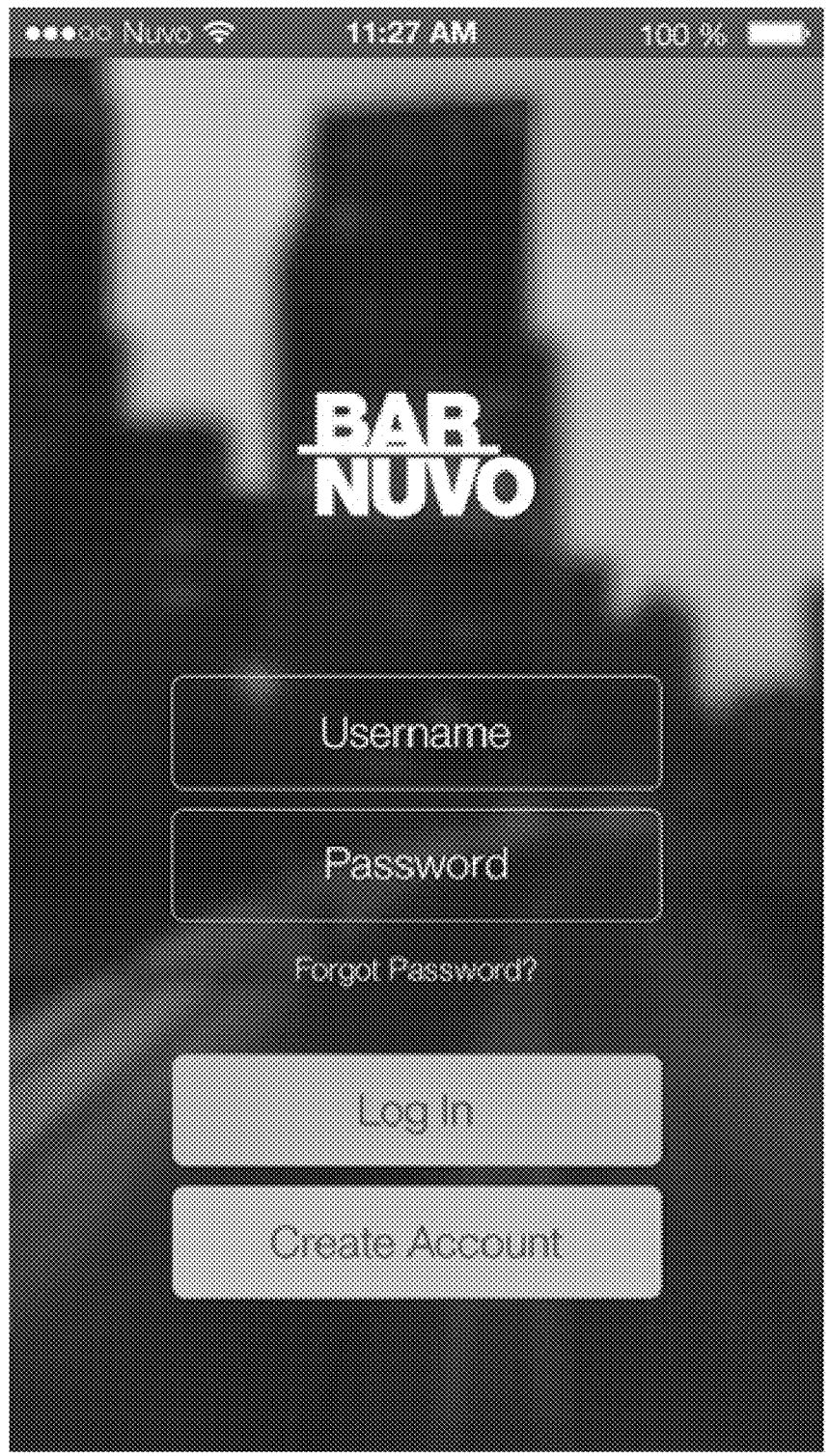
Figure 37:
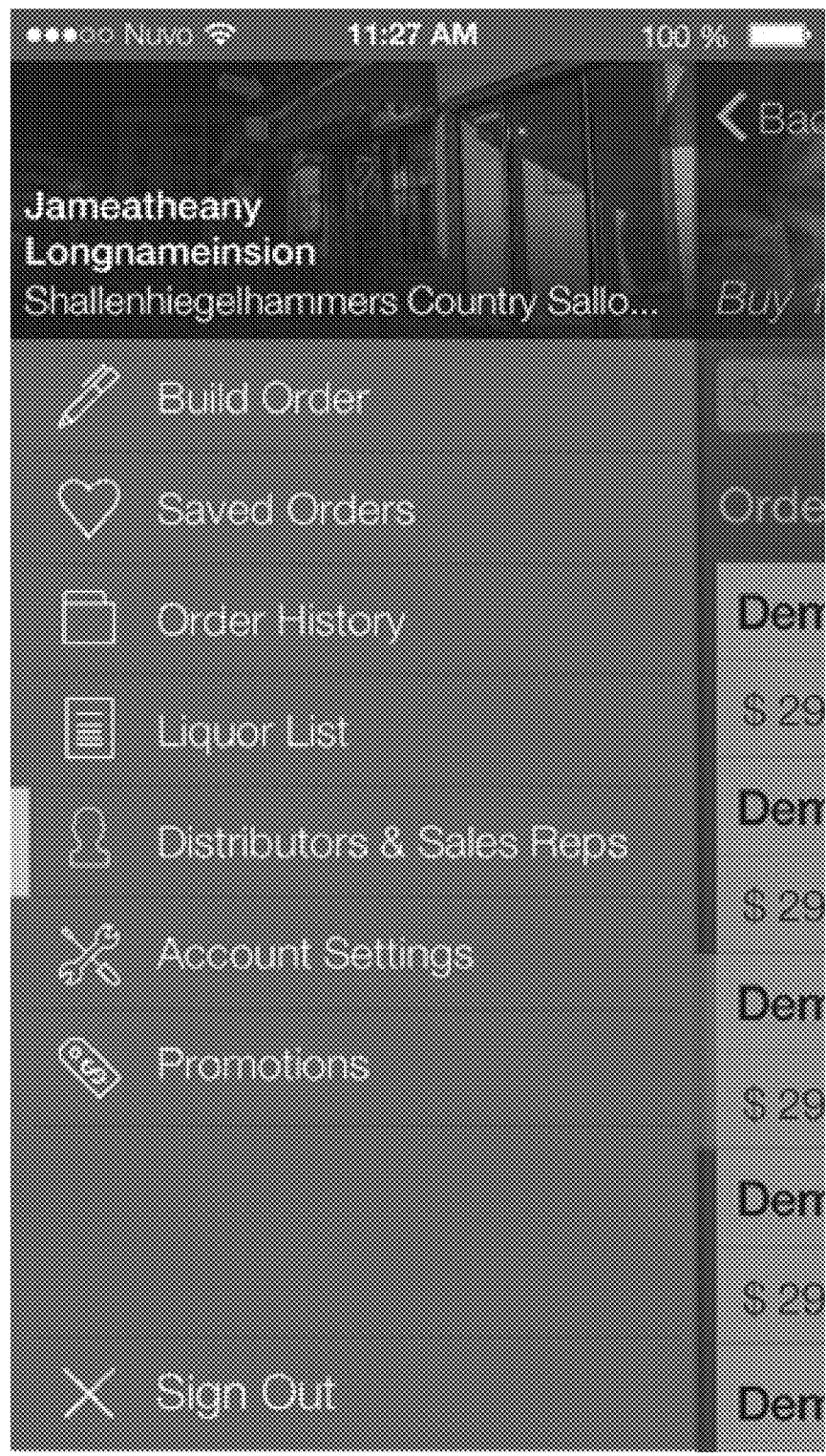
Figure 38:
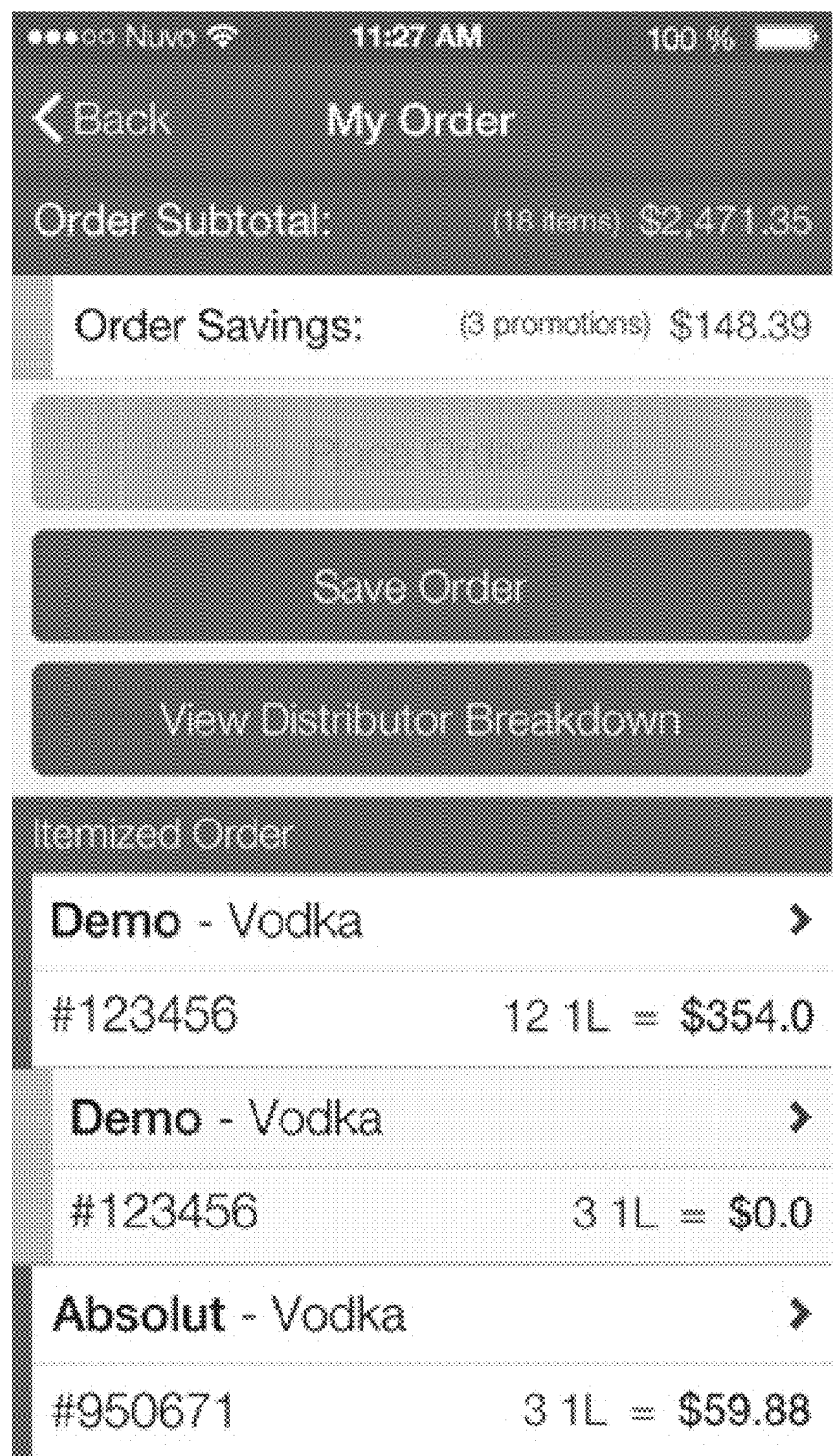
Figure 39:
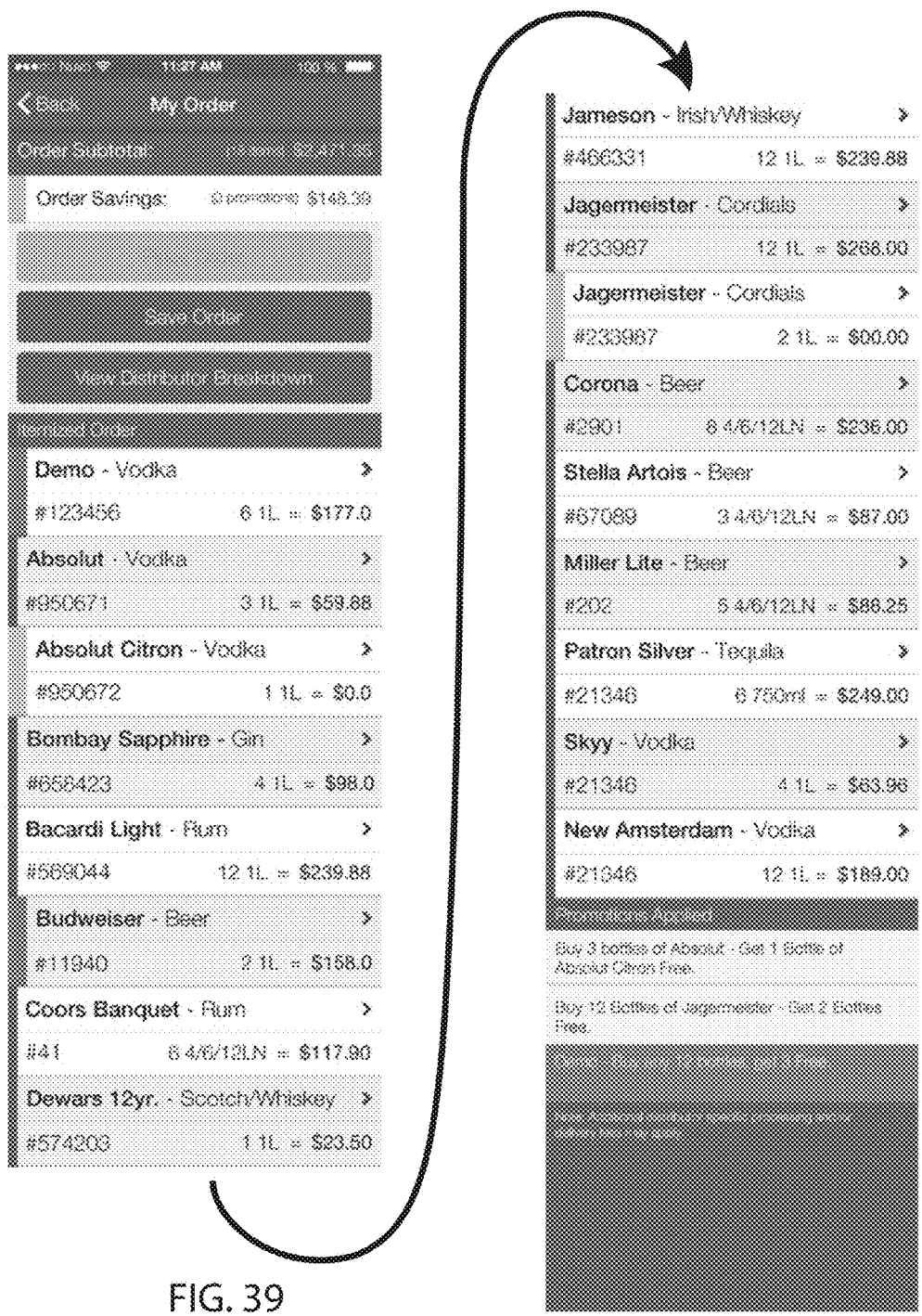
Figure 40:
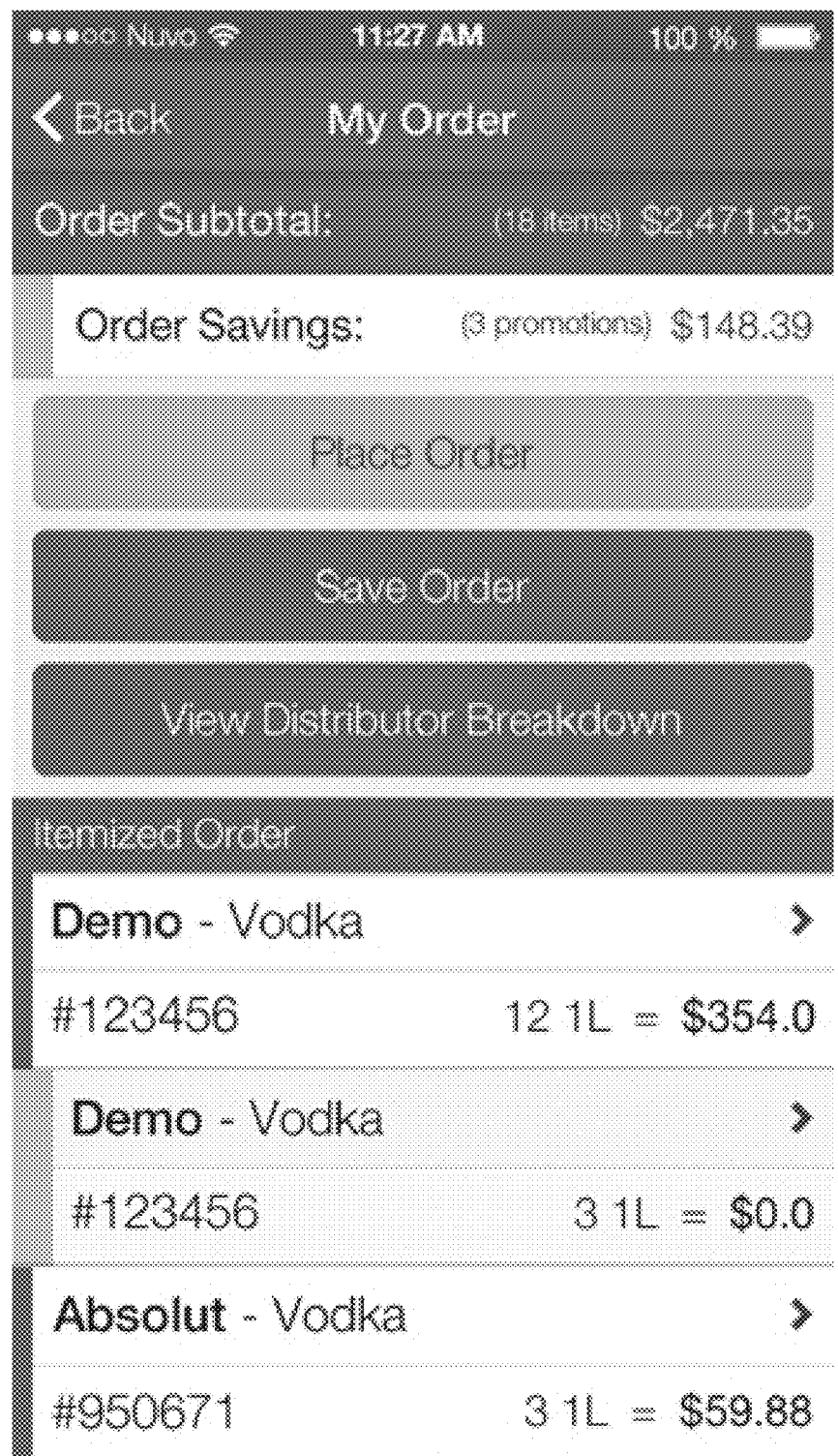
Figure 41:
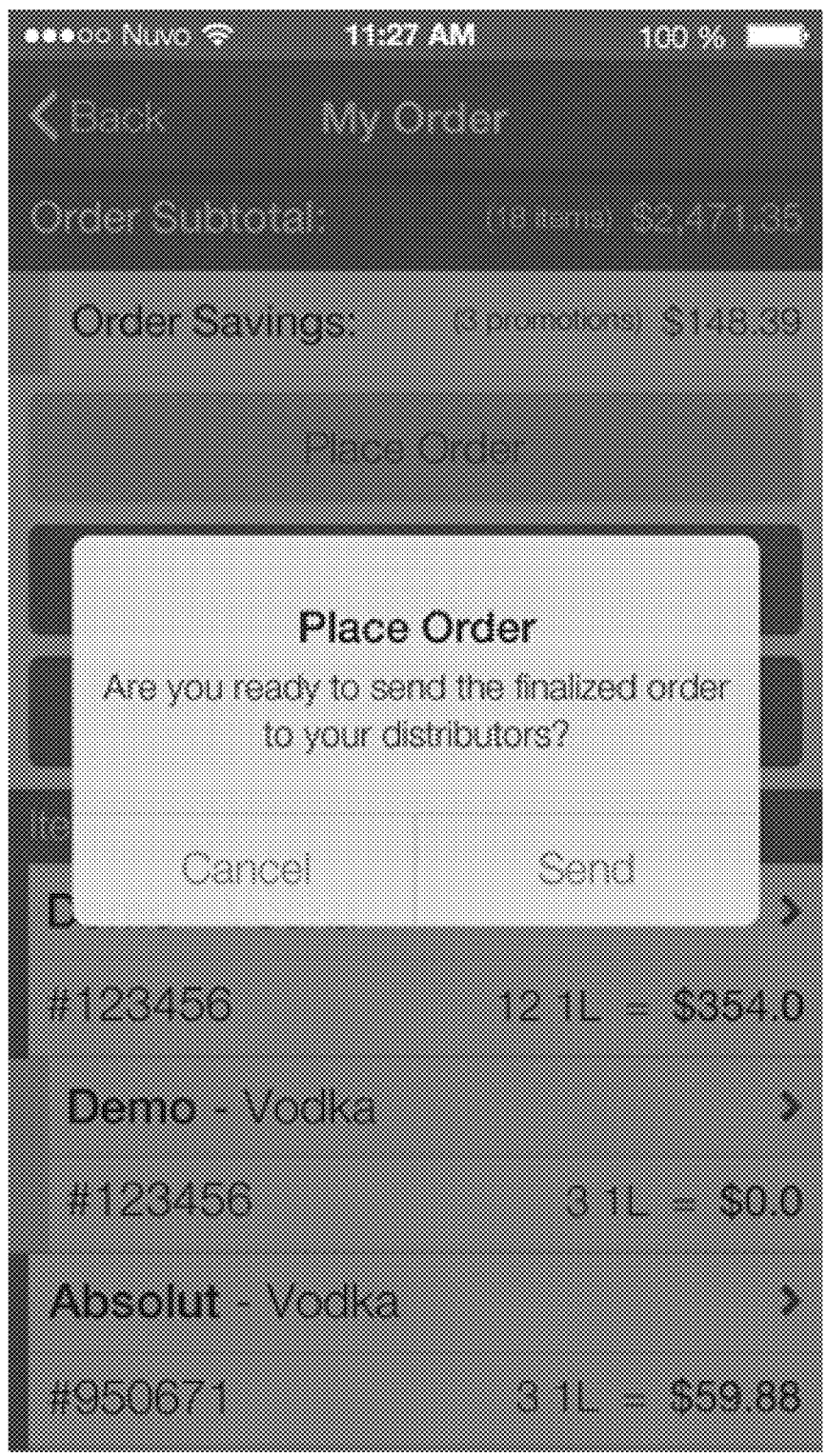
Figure 42:
Figure 43:
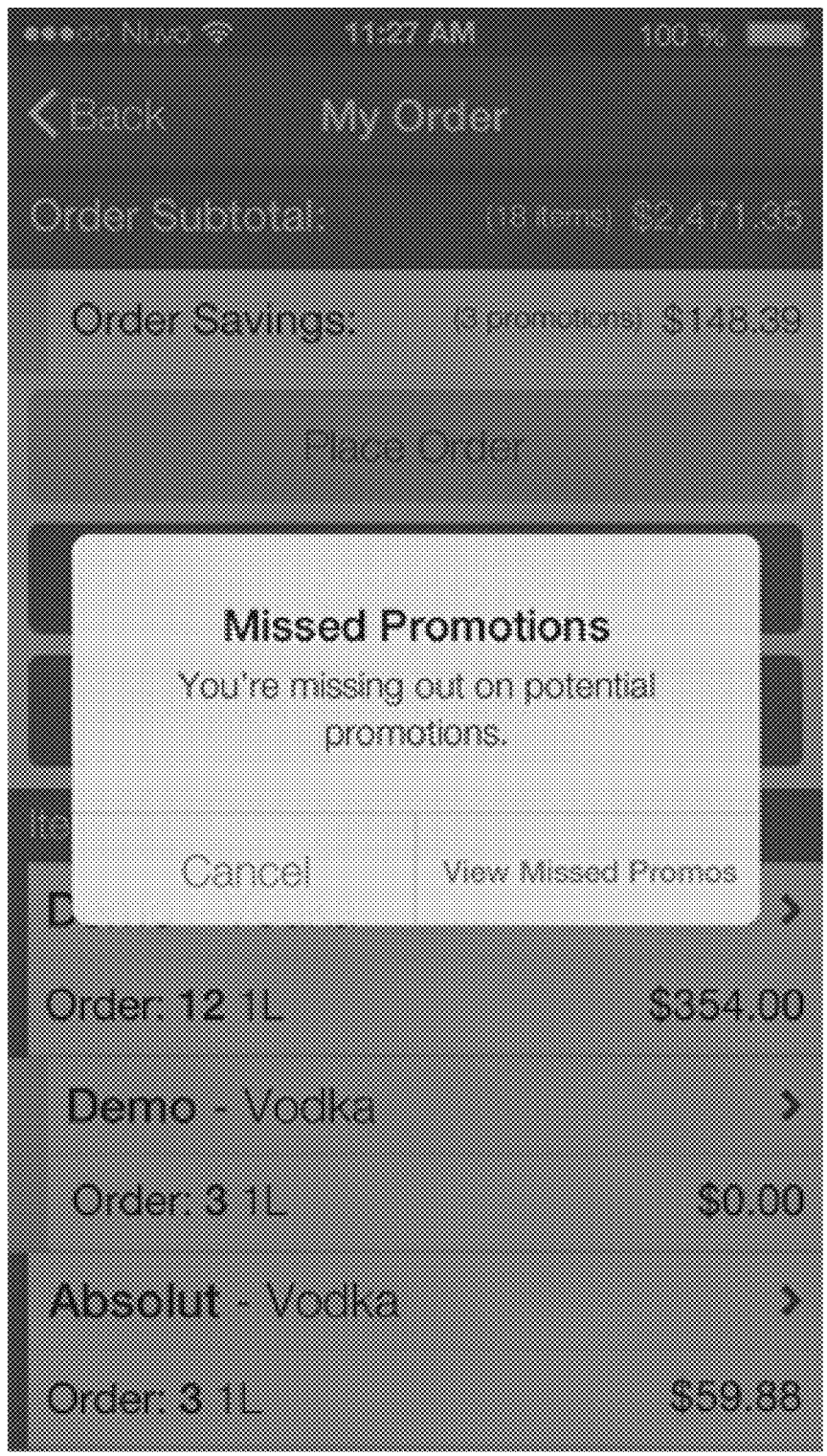
Figure 44:
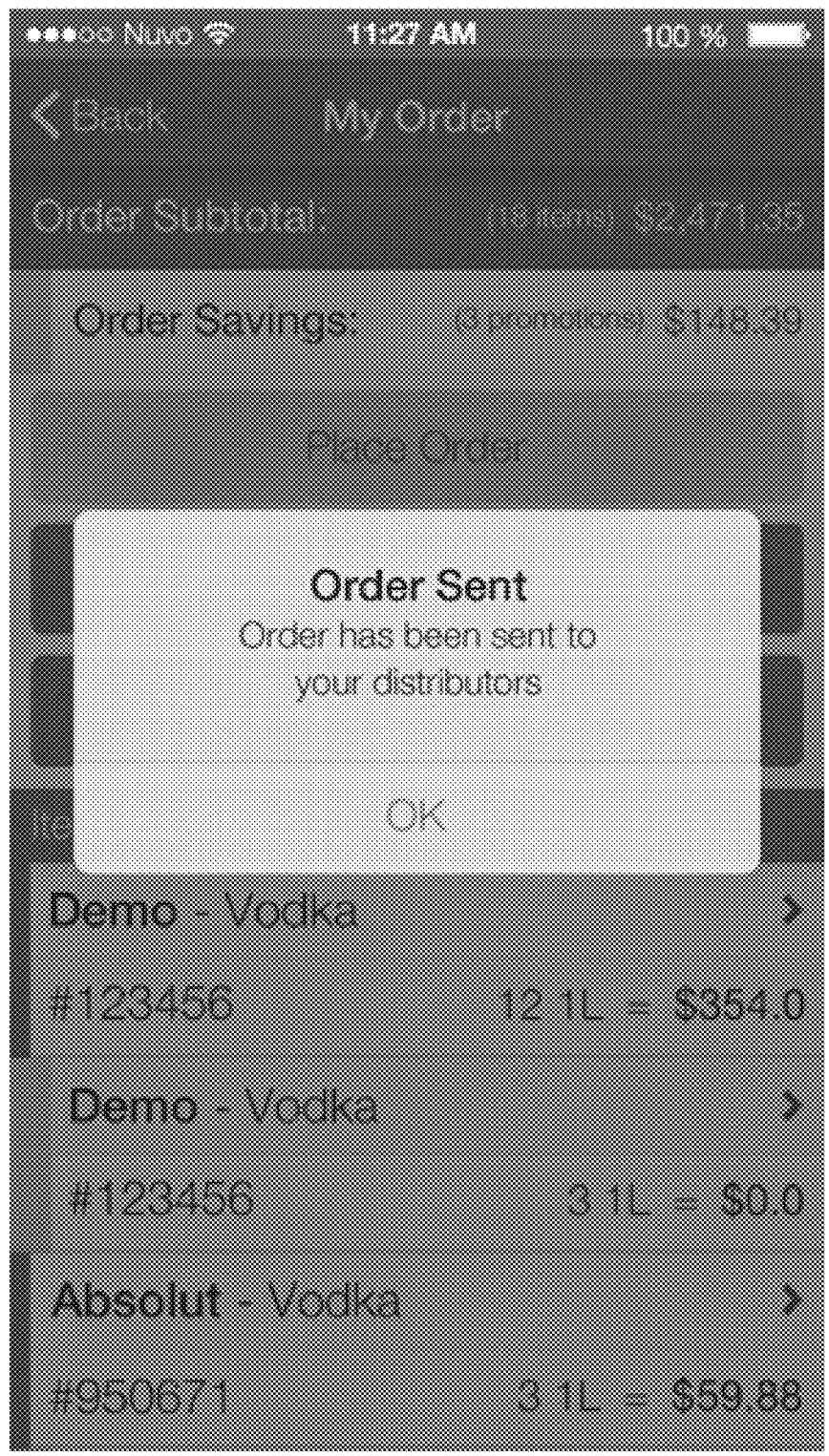
Figure 45:
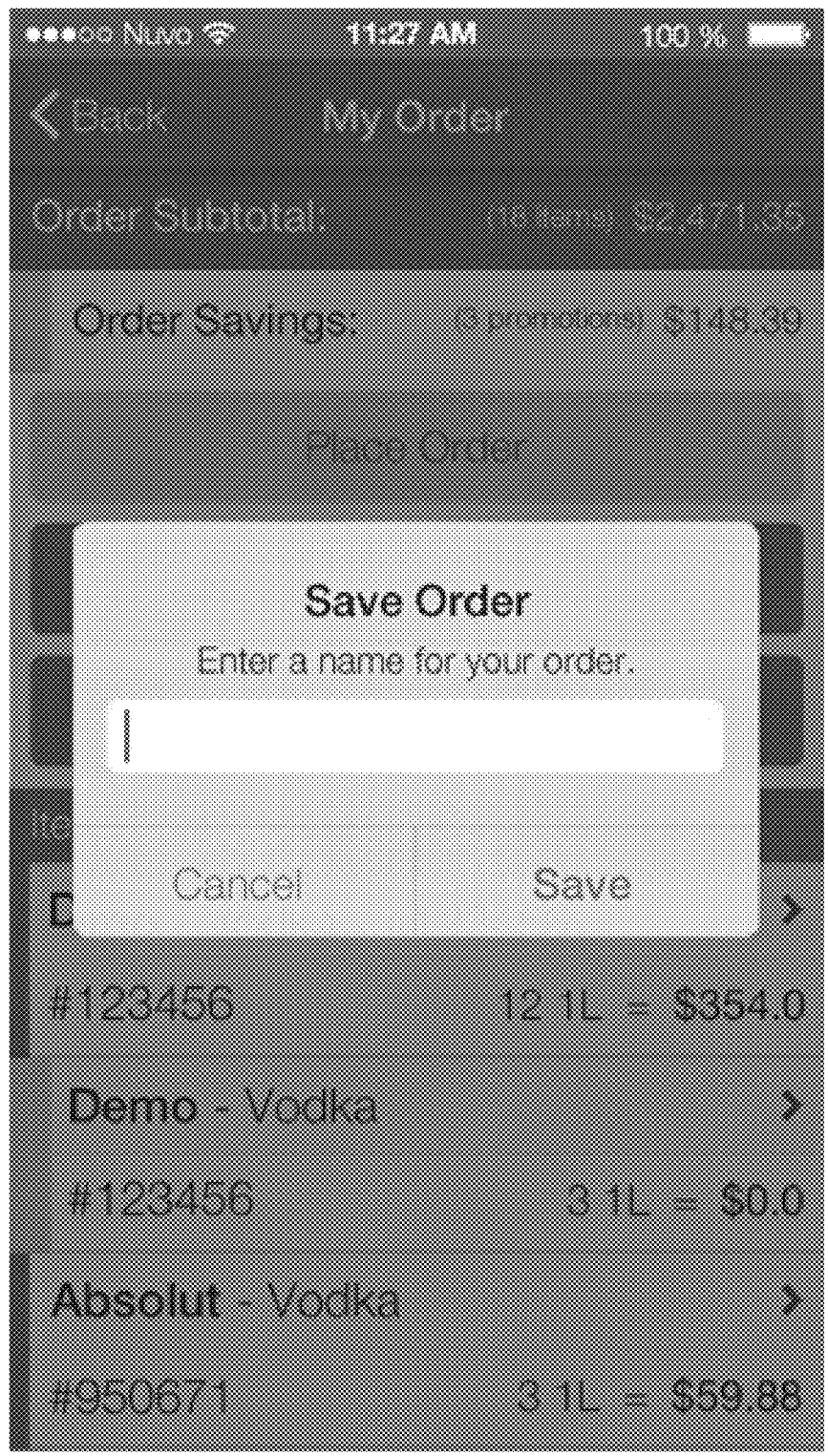
Figure 46:
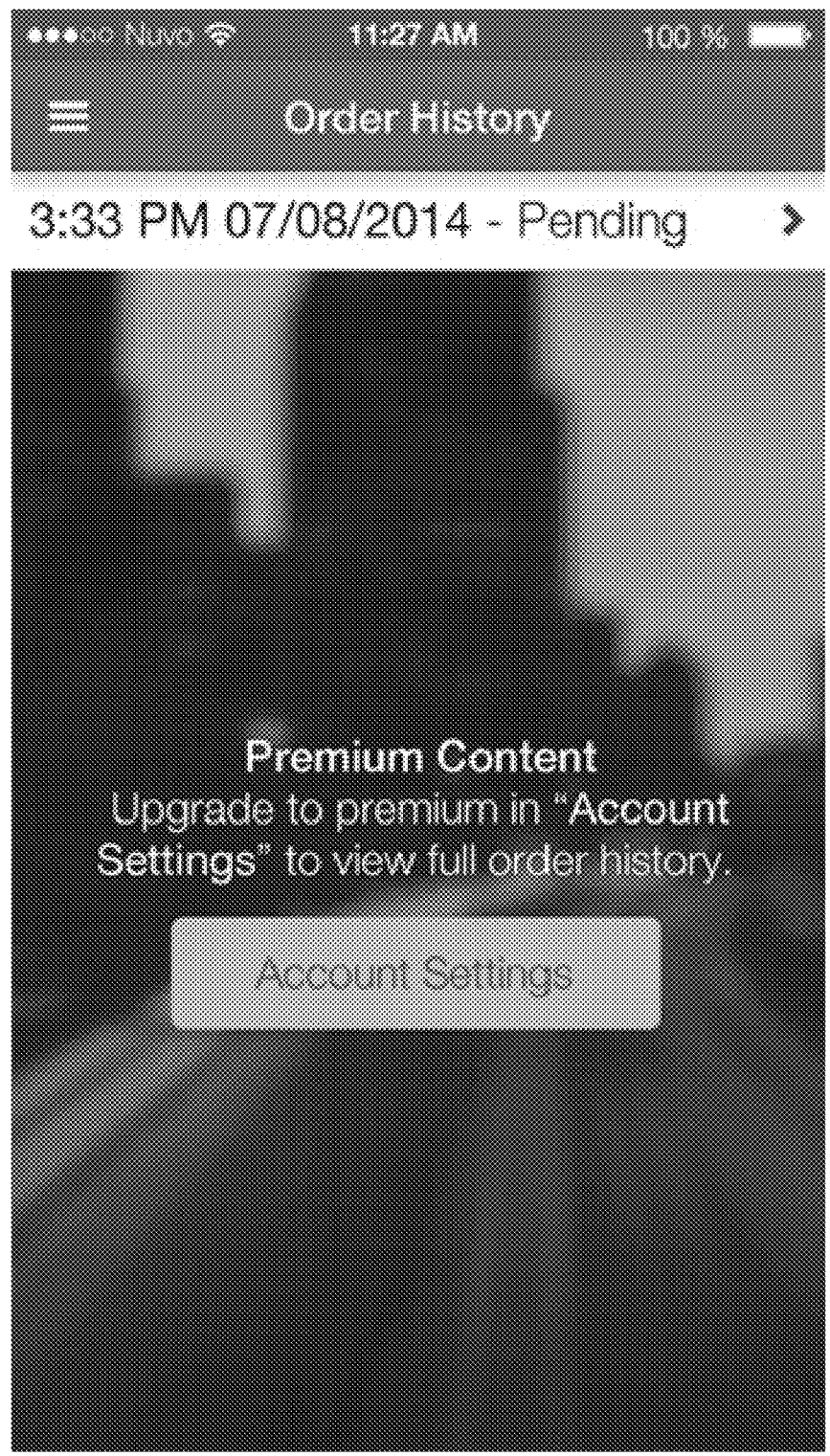
Figure 47:
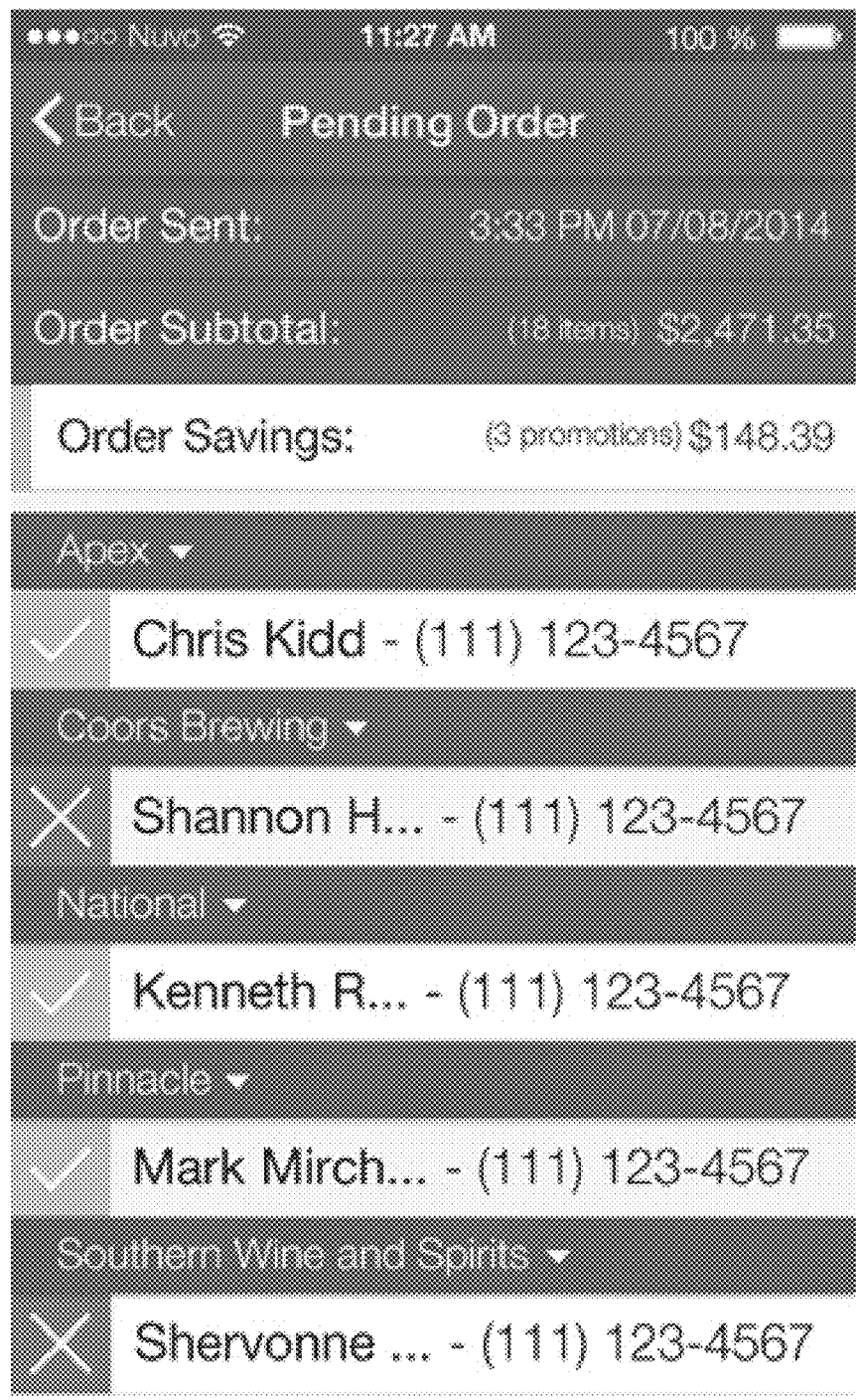
Figure 49:
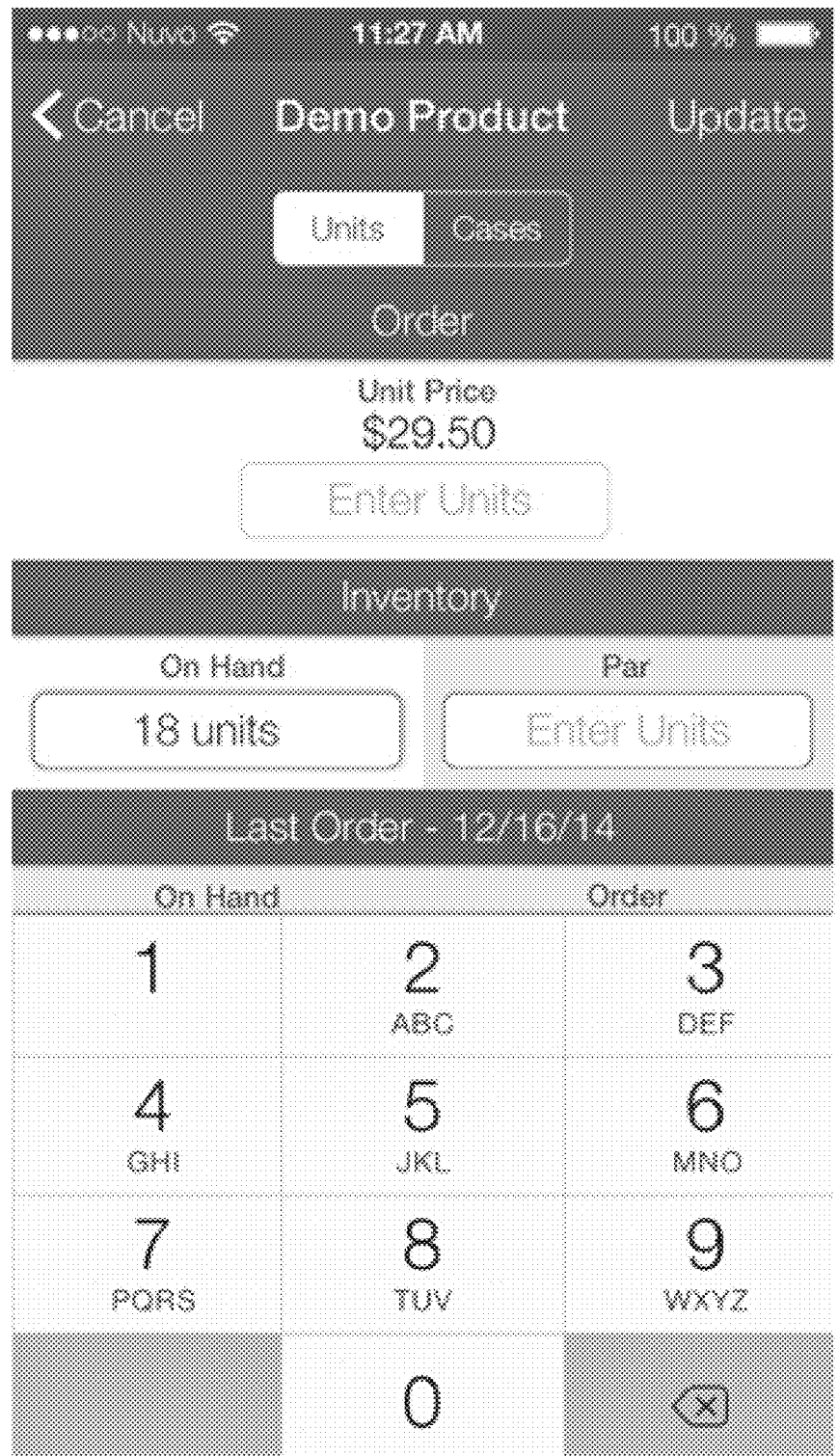
Figure 50:
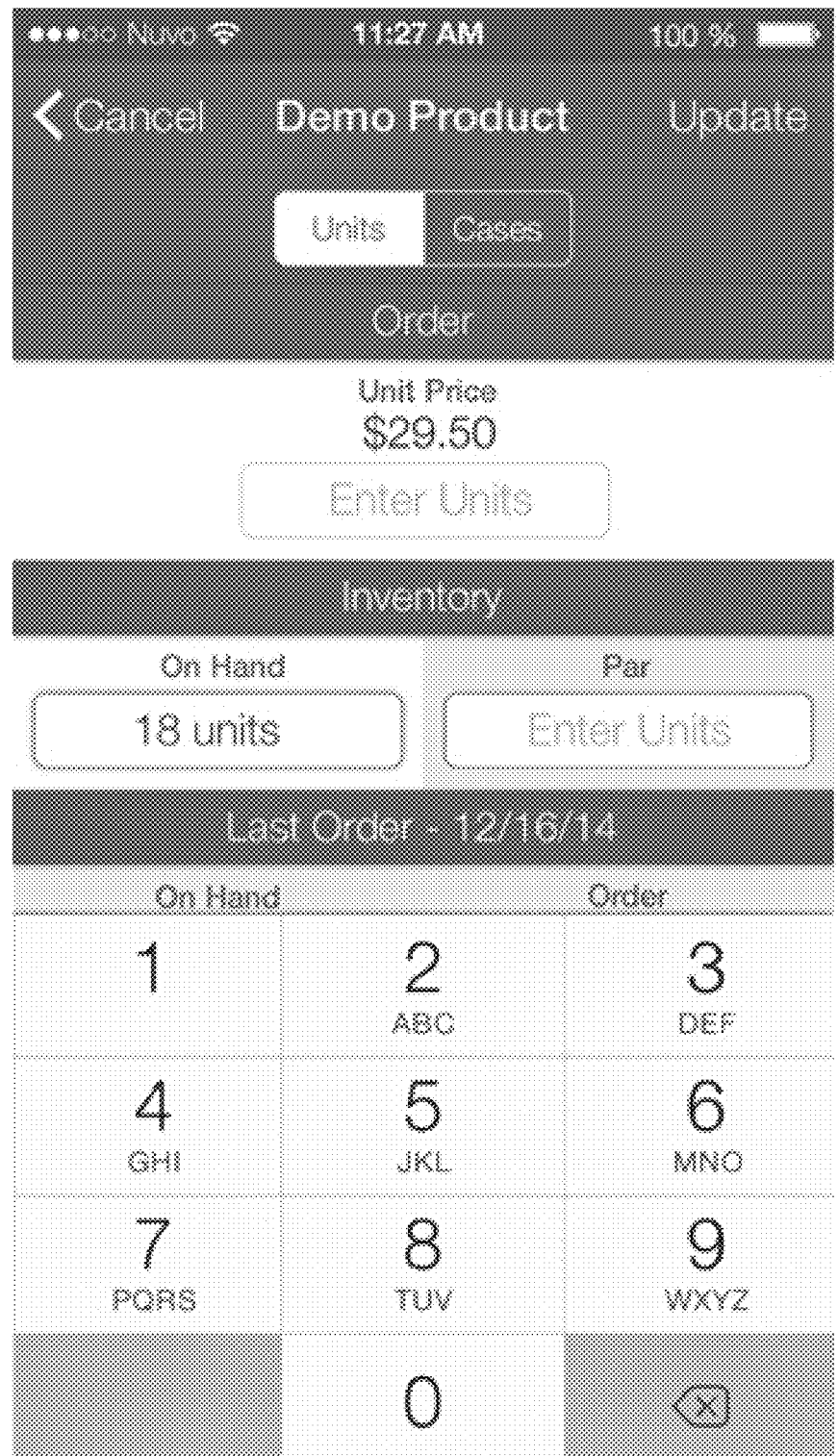
Figure 52:
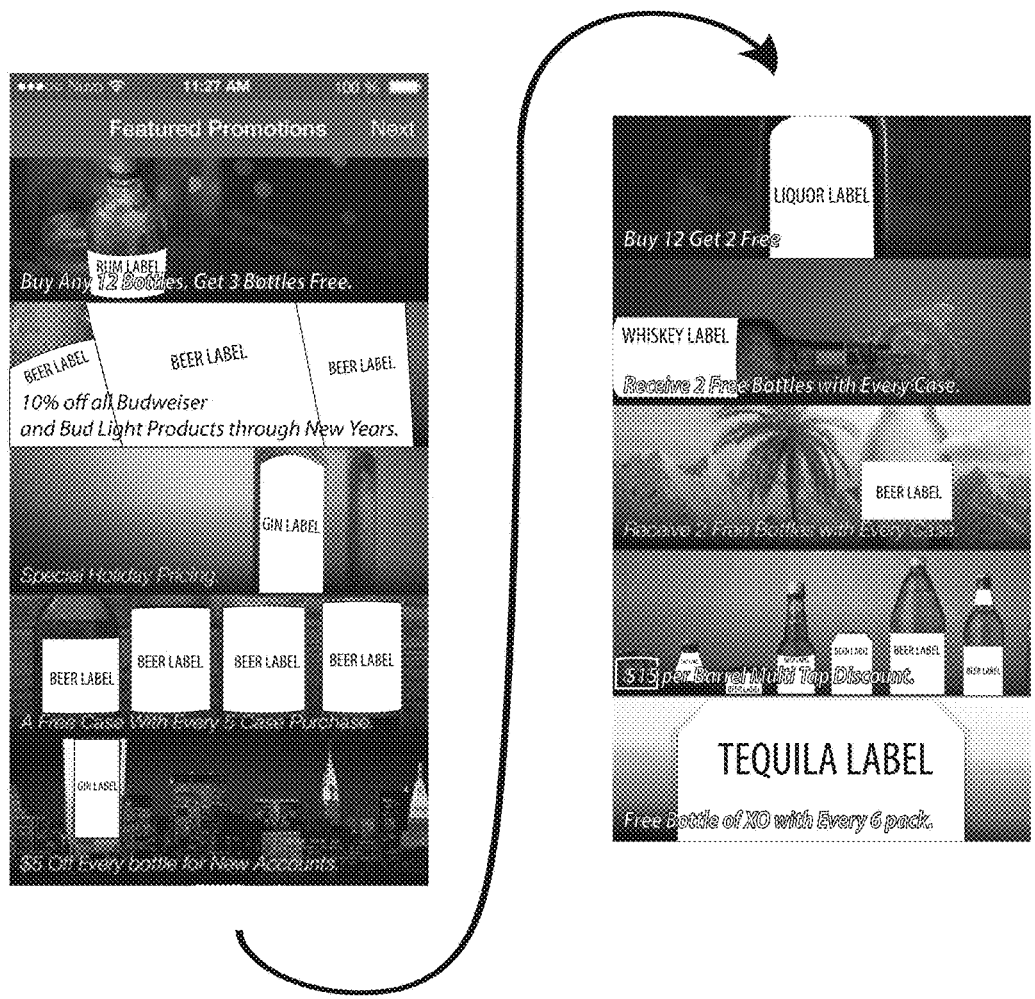
Figure 53:
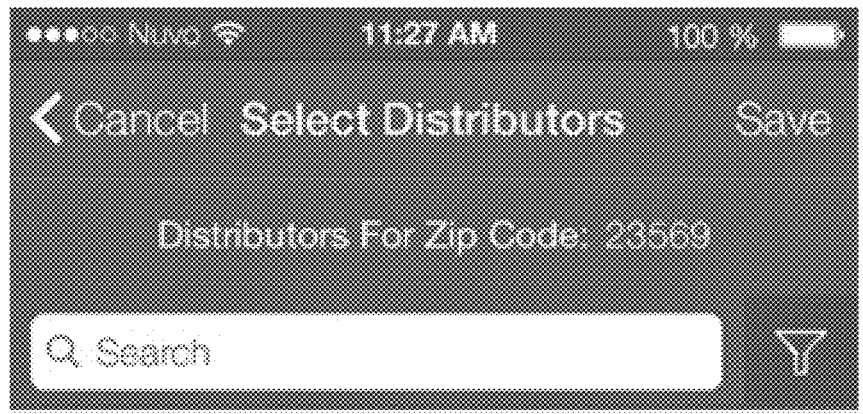
Figure 54:
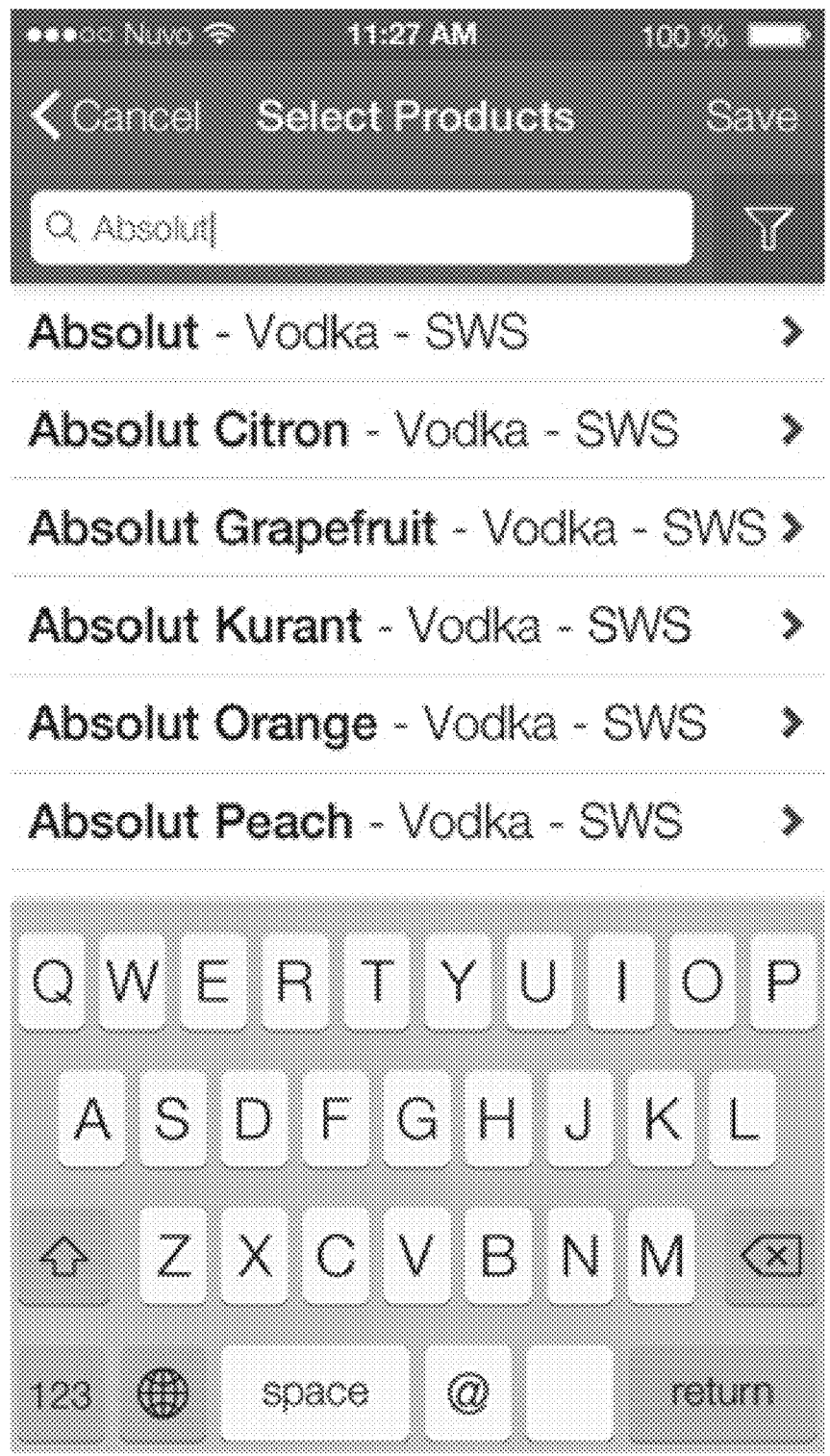
Figure 55:
Figure 56:

FIG. 8 depicts a block diagram of components of server 120, in accordance with an illustrative embodiment. It should be appreciated that FIG. 8 provides only an illustration of one implementation and does not imply any limitations with regard to the environments in which different embodiments may be implemented. Many modifications to the depicted environment may be made.

Server 120 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 814 and cache memory 816. In general, memory 806 can include any suitable volatile or non-volatile computer-readable storage media.

CMS 122 is stored in persistent storage 808 for execution by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information. As used herein, computer-readable storage media is not to be construed as including propagating signals per se.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

Communications unit 810, in these examples, provides for communications with other data processing systems or devices, for example supplier device 102, sales representative device 108, distributor device 114, and merchant devices 124 and 130. In these examples, communications unit 810 includes one or more network interface cards and one or more near field communication devices. Communications unit 810 may provide communications through the use of either or both physical and wireless communications links. Computer programs and processes may be downloaded to persistent storage 808 through communications unit 810.

I/O interface(s) 812 allows for input and output of data with other devices that may be connected to server 120. For example, I/O interface 812 may provide a connection to external devices 818 such as a keyboard, keypad, a touch screen, a camera, and/or some other suitable input device. External devices 818 can also include portable computer-readable storage media such as, for example, thumb drives, portable optical or magnetic disks, and memory cards. Software and data used to practice various embodiments can be stored on such portable computer-readable storage media and can be loaded onto persistent storage 808 via I/O interface(s) 812. I/O interface(s) 812 may also connect to a display 820.

Display 820 provides a mechanism to display data to a user and may be, for example, an embedded display screen or touch screen.

FIGS. 9-56 are example screenshots depicting an exemplary embodiment of the networked beverage inventory management and acquisition system of FIG. 1.

The programs described herein are identified based upon the application for which they are implemented in a specific embodiment. However, it should be appreciated that any particular program nomenclature herein is used merely for convenience, and thus the scope of the disclosure should not be limited to use solely in any specific application identified and/or implied by such nomenclature.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, various features described herein may be embodied as a system, method or computer program product. Accordingly, various features may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, various features may take the form of a computer program product embodied in one or more computer-readable media having computer readable program code/instructions embodied thereon.

Any combination of computer-readable media may be utilized. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for various features may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer. or server. In the latter scenario, the remote computer may be connected to the user's computer through any type of network, including a local area network (LAN)

or a wide area network (WAN), or the connection may be made to an external computer (for example, through the Internet using an Internet Service Provider).

Various features are described herein with reference to flowchart illustrations and/or block diagrams of methods, apparatus (systems) and computer program products according to various embodiments. It will be understood that each block of the flowchart illustrations and/or block diagrams, and combinations of blocks in the flowchart illustrations and/or block diagrams, can be implemented by computer program instructions. These computer program instructions may be provided to a processor such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

What is claimed is:

1. A method of optimizing computerized inventory orders over a distributed network comprising:
   receiving, from a first user device connected to the distributed network, a list of one or more products, the list including a par value and an inventory value associated with each of the one or more products, the par value and inventory value corresponding to a single delivery location;
   responsive to receiving the list of one or more products, determining, by one or more processors, an inventory order for the single delivery location based, at least in part, on the associated par value and the associated inventory value of each of the one or more products;
   receiving, from a second user device connected to the distributed network, a set of available promotions;
   responsive to receiving the set of available promotions, transmitting, over the distributed network by the one or more processors, the set of available promotions associated with at least one of the one or more products to the first user device;
   receiving, from the first user device, a selection of at least one promotion of the set of available promotions;
   automatically adjusting, by the one or more processors, a price of at least one of the one or more products associated with the at least one promotion to the inventory order;
   outputting to a display on the first user device, an updated inventory order including the adjusted price of the at least one of the one or more products associated with the at least one promotion;
   receiving, by the one or more processors, a user confirmation for the updated inventory order for delivery of the one or more products to the single delivery location;
   identifying, by the one or more processors, respective distributors associated with each product of the one or more products within the updated inventory order, wherein each of the products is associated with a single distributor;
   generating, by the one or more processors, a plurality of distributor specific inventory orders for each distributor identified as providing a product within the updated inventory order, wherein the plurality of distributor specific inventory orders each include a different format; and
   transmitting by the one or more processors, the plurality of distributor specific inventory orders to each of the identified distributors for fulfillment of the updated inventory order for the delivery location.

2. The method of claim 1, further comprising:
   determining, by the one or more processors, that at least one associated inventory value for a product is less than the associated par value; and
   transmitting, by the one or more processors, an alert to the first user device that the at least one associated inventory value is less than the associated par value.

3. The method of claim 1, further comprising:
   determining, by the one or more processors, that at least one promotion in the set of available promotions is applicable to a product in the inventory order;
   determining, by the one or more processors, that the applicable promotion has not been applied to the inventory order; and
   responsive to determining that the applicable promotion has not been applied to the inventory order, transmitting an alert to the first user device.

4. The method of claim 1, wherein the second user device is associated with a beverage distributor.

5. The method of claim 1, further comprising:
   receiving, from the first user device, a selection of one or more approved distributors; and
   transmitting, by the one or more processors, the plurality of distributor specific inventor orders to the approved distributors.

6. A method of identifying a product distributor based on electronic location information comprising:
   registering, by one or more processors, a merchant with a content management system containing beverage products, distributor, sales representative, and supplier information;
   responsive to registering the merchant, determining a location of the merchant based on electronic location information;
   providing, over a network, the merchant with access to at least one of the beverage inventory, distributor, sales representative, and supplier information stored on the content management system;
   receiving, by the one or more processors, a purchase request for a first beverage product and a second beverage product from the merchant;
   responsive to receiving the purchase request, automatically identifying, by the one or more processors, a first distributor for fulfilling a first portion of the purchase request corresponding to the first beverage product based on the electronic location information, and a second distributor for fulfilling a second portion of the purchase request corresponding to the second beverage product, wherein each beverage product is associated with a single distributor; and
   transmitting, via the network, the purchase request to the first identified distributor and the second identified distributor for fulfilment of the purchase request and delivery of the first beverage product and the second beverage product to the location of the merchant.

7. The method of claim 6, wherein identifying the first distributor and the second distributor is based, at least in part, on the location of the merchant.

8. The method of claim 6, further comprising:
determining a geographical region based on the electronic location information
determining a set of rules based on the geographical region; and
providing the merchant with access and receiving the purchase request are performed in accordance with the set of rules.

9. The method of claim 6, wherein identifying the first distributor and the second distributor comprises receiving user input from the merchant identifying at least one of the first distributor or the second distributor.

10. The method of claim 6, further comprising:
receiving, from the first distributor, an indication that a promotion is available for the the first beverage product and that the promotion is not applied to the purchase request; and
transmitting, by the one or more processors, a notification to the merchant that the promotion is not applied to the purchase request.

11. The method of claim 10, further comprising:
transmitting, by the one or more processors, a request to the merchant to apply the promotion to the purchase request; and
responsive to receiving instructions from the merchant to apply the promotion to the purchase request, transmitting the purchase request with the applied promotion to the identified distributor.

12. The method of claim 6, wherein registering the merchant comprises:
receiving, by the one or more processors, a credit application from the merchant; and
transmitting, by the one or more processors, the credit application to the first distributor for approval.

13. The method of claim 6, further comprising:
responsive to identifying the first distributor, determining a purchase request software format used by the first identified distributor; and
converting the purchase request into a format that is compatible with the purchase request software format used by the first identified distributor.

14. A non-transitory computer-readable medium having stored therein computer program instructions for automatically generating beverage product sub-orders based on associated metadata, the computer program instructions comprising:

program instructions to receive from a merchant device a beverage product order from a single geographic location comprising a plurality of beverage products, each beverage product of the plurality of beverage products having associated metadata;
program instructions to identify a distributor offering the selected beverage for each of the beverage products in the plurality of beverage products based, at least in part on the associated metadata, wherein each of the plurality of beverage products is offered by a single distributor;
program instructions to generate one or more sub-orders, wherein each sub-order includes the selected beverage products offered by the respective distributor, corresponds to one identified distributor;
program instructions to transmit each sub-order to the corresponding identified distributor: and
program instructions to output to the merchant device a confirmation of the beverage product order placement for the single geographic location.

15. The non-transitory computer-readable medium of claim 14, wherein the program instructions for ordering beverage products further comprise:
program instructions to receive a confirmation from at least one of the identified distributors or a sales representative associated with the identified distributor; and
program instructions to transmit the confirmation to the merchant device.

16. The non-transitory computer-readable medium of claim 14, wherein the program instructions for ordering beverage products further comprise program instructions to determine whether a promotional offer is available for any of the plurality of beverage products.

17. The non-transitory computer-readable medium of claim 16, wherein the program instructions for ordering beverage products further comprise:
program instructions to determine whether an available promotional offer is applied to a first beverage product of the plurality of beverage products; and
program instructions to transmit an alert to the merchant device, responsive to determining that the available promotional offer is not applied to the first beverage product.

18. The non-transitory computer-readable medium of claim 14, wherein the associated metadata includes data associating a particular beverage product of the plurality of beverage products with a particular distributor.

19. The non-transitory computer-readable medium of claim 14, wherein beverage product order corresponds to a single merchant.

* * * * *

(12) POST-GRANT REVIEW CERTIFICATE (230th)

United States Patent
Smith

(10) Number: US 10,467,585 J1
(45) Certificate Issued: Jul. 11, 2022

(54) BEVERAGE PRODUCT ACQUISITION AND INVENTORY MANAGEMENT SYSTEM

(71) Applicant: Jason K. Smith

(72) Inventor: Jason K. Smith

(73) Assignee: Jason K. Smith

Trial Number:

CBM2020-00029 filed Sep. 15, 2020

Post-Grant Review Certificate for:

Patent No.: 10,467,585
Issued: Nov. 5, 2019
Appl. No.: 15/061,026
Filed: Mar. 4, 2016

The results of CBM2020-00029 are reflected in this post-grant review certificate under 35 U.S.C. 328(b).

POST-GRANT REVIEW CERTIFICATE
U.S. Patent 10,467,585 J1
Trial No. CBM2020-00029
Certificate Issued Jul. 11, 2022

AS A RESULT OF THE POST-GRANT REVIEW PROCEEDING, IT HAS BEEN DETERMINED THAT:

Claims 1-19 are cancelled.

\* \* \* \* \*